(12) United States Patent
Kondo et al.

(10) Patent No.: US 6,975,770 B2
(45) Date of Patent: Dec. 13, 2005

(54) IMAGE COMPRESSION AND DECOMPRESSION WITH PREDICTOR SELECTION BASED ON EMBEDDING DATA

(75) Inventors: Tetsujiro Kondo, Tokyo (JP); Naoki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 09/824,284

(22) Filed: Apr. 2, 2001

(65) Prior Publication Data

US 2001/0043750 A1 Nov. 22, 2001

(30) Foreign Application Priority Data

Apr. 4, 2000 (JP) .............................. 2000-102132

(51) Int. Cl.[7] .............................................. G06K 9/36
(52) U.S. Cl. ....................... 382/238; 382/232; 382/100
(58) Field of Search ................................ 382/100, 232, 382/238, 239, 247; 348/460; 375/240.12; 358/3.28

(56) References Cited

U.S. PATENT DOCUMENTS 6,005,643 A * 12/1999 Morimoto et al. ..... 375/240.26

\* cited by examiner

*Primary Examiner*—Yon Couso
(74) *Attorney, Agent, or Firm*—Frommer Lawrence & Haug LLP; William S. Frommer; Darren M. Simon

(57) ABSTRACT

An embedded coding unit for embedding first data in second data, and outputting coded data, comprises a selecting unit, predicting unit, and prediction margin of error computing unit. The selecting unit selects a predicting method for predicting data of interest in the first data, based on the second data, the predicting unit obtains a prediction value corresponding to the data of interest based on the prediction method selected by the selecting unit, and the prediction margin of error computing unit computes prediction margin of error based on the data of interest and the prediction value, and outputs this as the coded data.

35 Claims, 27 Drawing Sheets

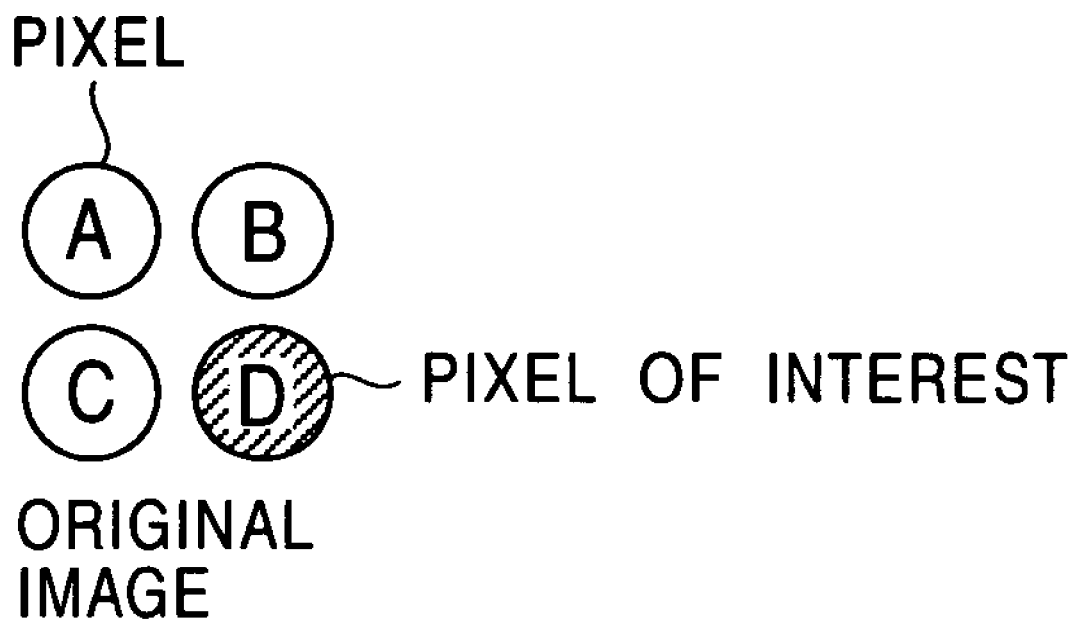

FIG. 9

| RELATION OF B, C, AND D | | EMBEDDING JUDGMENT | ADDED INFORMATION | PREDICTION VALUE | PREDICTION MARGIN OF ERROR |
|---|---|---|---|---|---|
| B ≠ C | B < D < C OR C < D < B | YES | 0 | B | D - B |
| | | | 1 | C | D - C |
| | B < C ≦ D OR D ≦ C < B | NO | — | B | D - B |
| | C < B ≦ D OR D ≦ B < C | NO | — | C | D - C |
| B = C | | — | NO | — | B | D - B |

FIG. 10

| RELATION OF A, B, C, AND D | | EMBEDDING JUDGMENT | ADDED INFORMATION | PREDICTION VALUE | PREDICTION MARGIN OF ERROR |
|---|---|---|---|---|---|
| B ≠ C | B < D < C OR C < D < B | YES | 0 | B | D - B |
| | | | 1 | C | D - C |
| | B < C ≦ D OR D ≦ C < B | NO | — | B | D - B |
| | C < B ≦ D OR D ≦ B < C | NO | — | C | D - C |
| A ≠ B = C | A < D < B OR B < D < A | YES | 0 | A | D - A |
| | | | 1 | B | D - B |
| | A < B ≦ D OR D ≦ B < A | NO | — | A | D - A |
| | B < A ≦ D OR D ≦ A < D | NO | — | B | D - B |
| A = B = C | — | NO | — | A | D - A |

PREDICTION METHOD
WHEREIN B IS SET AS    → 0 IS EMBEDDED
THE PREDICTION VALUE

PREDICTION METHOD
WHEREIN C IS SET AS    → 1 IS EMBEDDED
THE PREDICTION VALUE

PREDICTION METHOD WHEREIN C IS SET AS THE PREDICTION VALUE

FIG. 18

| RELATION OF B, C, AND d | | JUDGMENT RESULTS OF EMBEDDED INFORMATION | ADDED INFORMATION | DECODED VALUE |
|---|---|---|---|---|
| B ≠ C | B < B+d < C OR C < B+d < B | YES | 0 | B+d |
| | B < C+d < C OR C < C+d < B | YES | 1 | C+d |
| | B < C ≦ B+d OR B+d ≦ C < B | NO | — | B+d |
| | C+d ≦ B < C OR C < B ≦ C+d | NO | — | C+d |
| B = C | — | NO | — | B+d |

FIG. 19

| RELATION OF A, B, C, AND d | | JUDGMENT RESULTS OF EMBEDDED INFORMATION | ADDED INFORMATION | DECODED VALUE |
|---|---|---|---|---|
| B ≠ C | B < B+d < C OR C < B+d < B | YES | 0 | B+d |
| | B < C+d < C OR C < C+d < B | YES | 1 | C+d |
| | B < C ≤ B+d OR B+d ≤ C < B | NO | — | B+d |
| | C+d ≤ B < C OR C < B ≤ C+d | NO | — | C+d |
| A ≠ B = C | A < A+d < B OR B < A+d < A | YES | 0 | A+d |
| | A < B+d < B OR B < B+d < A | YES | 1 | B+d |
| | A < B ≤ A+d OR A+d ≤ B < A | NO | — | A+d |
| | B+d ≤ A < B OR B < A ≤ B+d | NO | — | B+d |
| A = B = C | — | NO | — | A+d |

| COMPRESSING METHOD | IMAGE #1 | IMAGE #2 |
|---|---|---|
| PRESENT METHOD | 0.681 | 0.519 |
| CONVENTIONAL PREDICTION ENCODING | 0.691 | 0.539 |

IMAGE COMPRESSION AND DECOMPRESSION WITH PREDICTOR SELECTION BASED ON EMBEDDING DATA

BACKGROUND OF THE INVENTION

1. Field of the Invention

The present invention relates to an embedded coding unit and embedded coding method, a decoding unit and decoding method, and a storage medium, and particularly relates to an embedded coding unit and embedded coding method, a decoding unit and decoding method, and a storage medium, whereby information can be embedded in images without deteriorating the image quality of the decoded image and also without increasing the amount of data.

2. Description of the Related Art

One of the techniques of embedding information in data without increasing the amount of data is to convert the least significant bit or the lower two bits of digital audio data for example, into embedded information. With this technique, advantage is taken of the fact that the lower bits of digital audio data do not significantly influence sound quality, and accordingly the lower bits are simply replaced with the information to be embedded. Accordingly, when digital audio data wherein information has been embedded is reproduced, the lower bits are output as is without being restored to the original state. That is, it is difficult to restore the lower bits embedded with information to the original state, and also, the lower bits do not significantly influence the sound quality, so the digital audio data is output in the state of containing information embedded therein.

However, according to the above-described technique, data which differs from the original data is output. Accordingly, there is some degree of effect on the sound quality in the event that the data is audio data, or on the image quality in the event that the data is video data.

SUMMARY OF THE INVENTION

The present invention has been made in light of the above, and accordingly, it is an object thereof to enable information to be embedded in images without deteriorating the image quality of the image and also without increasing the amount of data, for example.

To this end, according to one aspect of the present invention, an embedded coding unit for embedding first data in second data, and outputting coded data, comprises selecting means, predicting means, and prediction margin of error computing means.

The selecting means selects a predicting method for predicting data of interest in the first data, based on the second data.

The predicting means obtains a prediction value corresponding to the data of interest based on the prediction method selected by the selecting means.

The prediction margin of error computing means computes prediction margin of error based on the data of interest and the prediction value, and outputs this as the coded data.

The predicting/embedding means may take data nearby the data of interest within the first data as a prediction value corresponding to the data of interest.

The embedded coding unit according to the present invention may further comprise judging means for judging whether or not the second data can be embedded as to the data of interest, and in the event that the second data can be embedded as to the data of interest, the selecting means may make selection of the prediction method based on the second data.

In the event that the second data cannot be embedded as to the data of interest, the selecting means may make selection of the prediction method based on the data of interest and the first data used for prediction of the data of interest, and the predicting means may obtain a prediction value corresponding to the data of interest, based on the prediction method selected by the selecting means.

The judging means may judge whether or not the second data can be embedded as to the data of interest, based on the data of interest and the first data used for prediction of the data of interest. Also, the judging means may judge the magnitude relation between the data of interest and two sets of the first data used for prediction of the data of interest, wherein, in the event that the data of interest is a value within the range of the two sets of first data, judgment may be made that the second data can be embedded as to the data of interest, and wherein, in the event that the data of interest is a value not within the range of the two sets of first data, judgment may be made that the second data cannot be embedded as to the data of interest.

In the event that the judging means judges that the second data can be embedded as to the data of interest, the selecting means may select one of two predicting methods used for predicting the data of interest respectively having the two sets of first data as the prediction values thereof, based on the second data. Also, in the event that the judging means judges that the second data cannot be embedded as to the data of interest, the selecting means may select, of the two predicting methods used for predicting the data of interest respectively having the two sets of first data, that with the greater prediction margin of error, as the prediction values thereof.

In the event that the two sets of the first data used for prediction of the data of interest are the same value, two sets of first data may be extracted, made up of one of the two sets of first data and another set of first data nearby the data of interest, wherein the judging means may judge the magnitude relation between the data of interest and two sets of the first data used for prediction of the data of interest. In the event that the data of interest is a value within the range of the two sets of first data, judgment may be made that the second data can be embedded as to the data of interest, and in the event that the data of interest is a value not within the range of the two sets of first data, judgment may be made that the second data cannot be embedded as to the data of interest.

In the event that the judging means judges that the second data can be embedded as to the data of interest, the selecting means may select one of two predicting methods used for predicting the data of interest respectively having the two sets of first data as the prediction values thereof, based on the second data.

In the event that the judging means judges that the second data cannot be embedded as to the data of interest, the selecting means selects, of two predicting methods used for predicting the data of interest respectively having the two sets of first data, that with the greater prediction margin of error, as the prediction values thereof.

The first data may be image data, and the first data and the second data may be one part and the other part of the image data separated into two.

The embedded coding unit may further comprise separating means for separating the image data into two parts, for embedding the second data as the other part as to the first data as the one part.

The embedded coding may also further comprise compressing means for compressing the second data separated by the separating means, wherein the separating means counts the amount of data capable of being embedded in the first data, compares the counted data amount and the compressed second data amount, and optimally separates the image data into two, based on the comparison results.

According to another aspect of the invention, a method for embedding first data in second data, and outputting coded data, comprises the steps of: selecting a predicting method for predicting data of interest in the first data, based on the second data; obtaining a prediction value corresponding to the data of interest based on the selected prediction method; computing prediction margin of error based on the data of interest and the prediction value; and outputting the prediction margin of error as the coded data.

According to another aspect of the invention, a storage medium stores a program which is controllable by a computer, for embedding first data in second data, and outputting coded data, and which comprises the steps of:

selecting a predicting method for predicting data of interest in the first data, based on the second data;
obtaining a prediction value corresponding to the data of interest based on the selected prediction method;
computing prediction margin of error based on the data of interest and the prediction value; and
outputting the prediction margin of error as the coded data.

According to another aspect of the invention, a decoding unit for decoding coded data encoded by embedding second data in first data, into the first data and the second data, comprises recognizing means and decoding means.

The recognizing means recognizes a prediction method for predicting a prediction value corresponding to the first data, from data of interest in the coded data.

The decoding means decodes the data of interest into the original the first data, and also decodes the second data, based on the prediction method recognized by the recognizing means.

The decoding unit may further comprise judging means for judging whether or not the second data is embedded as to the data of interest; wherein, in the event that the second data is embedded as to the data of interest, the second data may be decoded based on the prediction method.

The judging means may judge whether or not the second data is embedded as to the data of interest, based on the data of interest and the first data already decoded.

In the event that the second data is not embedded as to the data of interest, the recognizing means may recognize the prediction method based on the data of interest and the first data already decoded, and the decoding means may decode the data of interest into the original the first data, based on the prediction method recognized by the recognizing means.

The judging means may judge the magnitude relation between the data of interest and two sets of the first data already decoded, wherein, in the event that the data of interest is smaller than the difference between the two sets of first data already decoded, judgment may be made that the second data is embedded as to the data of interest, and wherein, in the event that the data of interest is not smaller than the difference between the two sets of first data already decoded, judgment may be made that the second data is not embedded as to the data of interest.

Of the predicting methods respectively having the two sets of already-decoded first data as the prediction values thereof with regard to the data of interest in which the second data is embedded, the recognizing means may recognize the prediction method wherein the decoding results of the data of interest are within the range of the two sets of first data as being the prediction method for predicting the first data corresponding to the data of interest. Also, of the predicting methods respectively having the two sets of already-decoded first data as the prediction values thereof with regard to the data of interest in which the second data is not embedded, the recognizing means may recognize the prediction method with the greater prediction margin of error as being the prediction method for predicting the first data corresponding to the data of interest.

In the event that the two sets of the first data already decoded are the same value, two sets of first data comprising one of the two sets of first data and the other first data already decoded may be extracted, and the judging means may judge the magnitude relation between the data of interest and two sets of the first data. In the event that the data of interest is smaller than the difference between the two sets of first data, judgment may be made that the second data is embedded as to the data of interest, and in the event that the data of interest is not smaller than the difference between the two sets of first data, judgment may be made that the second data is not embedded as to the data of interest.

Of the predicting methods respectively having the two sets of first data as the prediction values thereof with regard to the data of interest in which the second data is embedded, the recognizing means may recognize the prediction method wherein the decoding results of the data of interest are within the range of the two sets of first data as being the prediction method for predicting the first data corresponding to the data of interest.

Of the predicting methods respectively having the two sets of first data as the prediction values thereof with regard to the data of interest in which the second data is not embedded, the recognizing means may recognize the prediction method wherein the prediction margin of error is greater as being the prediction method for predicting the first data corresponding to the data of interest.

The first data may be image data, and the first data and the second data may be one part and the other part of the image data separated into two.

The decoding may further comprise joining means for joining the decoded first data as the one part and the decoded second data as the other part, to configure the original the image.

In the event that the second data is compressed and embedded in the first data, the decoding means may decode the compressed second data. The decoding unit may further comprise expanding means for expanding the compressed second data back into second data, and the joining means may join the decoded first data and the second expanded data to configure the original the image.

According to another aspect of the present invention, a decoding method for decoding coded data encoded by embedding second data in first data, into the first data and the second data, comprises the steps of: recognizing a prediction method for predicting a prediction value corresponding to the first data, from data of interest in the coded data; and decoding the data of interest into the original the first data, and also decoding the second data, based on the recognized prediction method.

According to another aspect of the present invention, a storage medium stores a program which is controllable by a computer, for embedding first data in second data, and outputting coded data, and which comprises the steps of: recognizing a prediction method for predicting a prediction value corresponding to the first data, from data of interest in the coded data; and decoding the data of interest into the original the first data, and also decoding the second data, based on the recognized prediction method.

With the embedding apparatus, embedding method, and first recording medium according to the present invention, a prediction method for predicting the prediction value of data of interest focused on from said first data is selected based on said second data, and the data of interest is predicted according to the prediction method, thereby obtaining a prediction value, and also the second data is embedded in the data of interest. Then, the prediction margin of error of the prediction value is obtained, and output as coded data. Thus, completely-reversible embedding can be realized.

With the decoding apparatus, decoding method, and second recording medium according to the present invention, a prediction method used for predicting the prediction value of the first data is recognized from data of interest focused on from the coded data, and based on the prediction method, the data of interest is decoded to the original first data and also the second data embedded in the data of interest is decoded. Accordingly, the coded data can be decoded into the first and second data, without overhead.

BRIEF DESCRIPTION OF THE DRAWINGS

FIG. 3 is a diagram for describing the processing of the embedding judging circuit 22 shown in FIG. 2;

FIG. 9 is a diagram illustrating the processing rules for the embedded compressing coding apparatus 11 shown in FIG. 2;

FIG. 10 is another diagram illustrating the processing rules for the embedded compressing coding apparatus 11 shown in FIG. 2;

FIG. 18 is a diagram illustrating the rules for the processing with the decoding apparatus 12 shown in FIG. 11;

FIG. 19 is another diagram illustrating the rules for the processing with the decoding apparatus 12 shown in FIG. 11;

DESCRIPTION OF THE PREFERRED EMBODIMENTS

Figure 1:
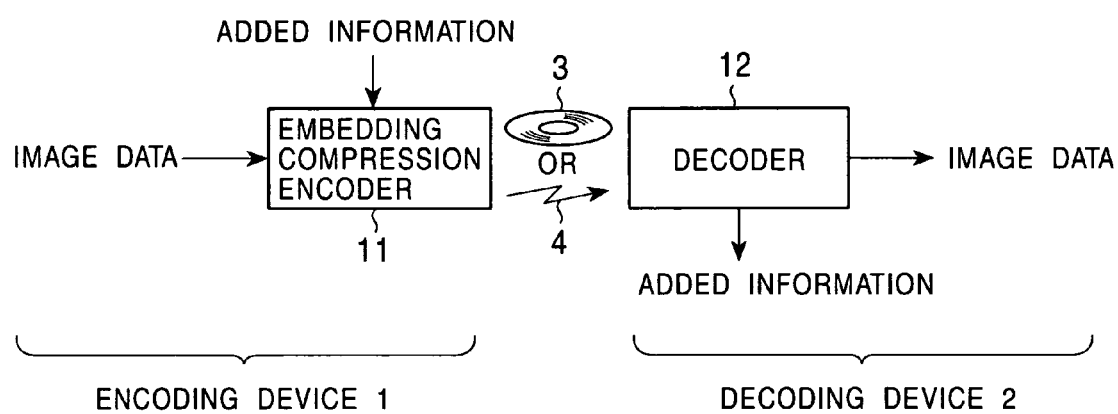
FIG. 1 is a diagram illustrating a configuration example of an embodiment of an embedded compressing/decoding system to which the present invention has been applied.

FIG. 1 illustrates a configuration example of an embodiment of a of an embedded compressing/decoding system (note that the term "system" here refers to an arrangement wherein multiple apparatuses are logically assembled, and accordingly, whether or not the components are contained within the same housing is irrelevant) to which the present invention has been applied.

This embedded compressing/decoding system is configured of a encoding unit 1 and a decoding unit 2, wherein the coding unit encodes images for example which are to be coded and outputs the coded data, and the decoding unit 2 decodes this coded data into the original image.

That is to say, the coding unit 1 is made up of an embedded compressing coding apparatus 11, to which is supplied an image to be coded, and added information to be embedded in the image. The embedded compressing coding apparatus 11 obtains and outputs coded data by performing compressing coding of the image (digital image data) and at the same time embedding added information (digital data). The coded data output by the embedded compressing coding apparatus 11 is recorded on a recording medium 3 such as semiconductor memory, a magneto-optical disk, a magnetic disk, an optical disc, magnetic tape, or a PD disk, or may be transmitted to the decoding unit 2 via a transmission medium 4 such as a terrestrial broadcasting, satellite broadcasting, a cable television (CATV) network, the Internet, or a public network.

The decoding unit 2 is made up of a decoding unit 12, where coded data provided via the recording medium 3 or transmission medium 4 is received. The decoding unit 12 decodes the coded data into the original image, and added information embedded therein. The decoded image is supplied to, for example, an unshown monitor or the like, where it is displayed.

Now, the added information may be, for example, text data, audio data, and reduced images, relating to the original image, or may be data unrelated to the original image. That is, various types of data (including programs) may serve as the added information.

Figure 2:
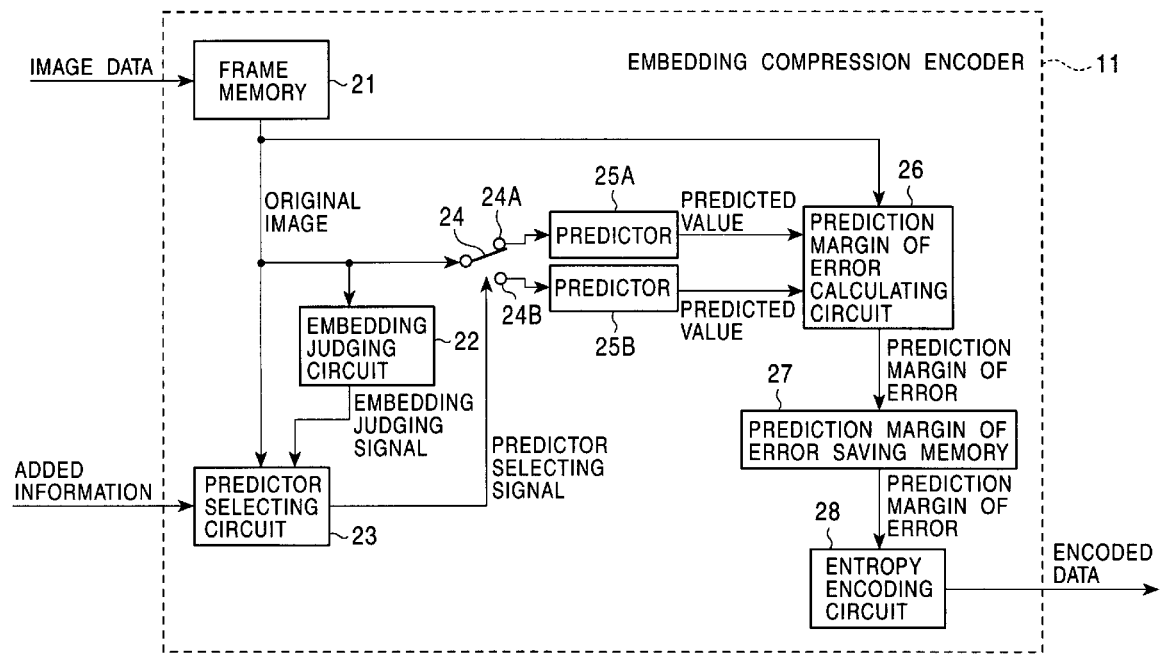
FIG. 2 is a block diagram illustrating an example configuration of the embedded compressing coding apparatus 11 shown in FIG. 1.

Next, FIG. 2 illustrates a configuration example of the embedded compressing coding apparatus 11 shown in FIG. 1.

The image data which is to be coded is supplied to frame memory 21, and the added information to be embedded in the image data is supplied to the predictor selecting circuit 23.

The frame memory 21 stores the image data supplied thereto in increments of individual frames, for example. The image data stored in the frame memory 21 is supplied as necessary to the embedding judging circuit 22, predictor selecting circuit 23, switch 24, and prediction margin of error calculating circuit 26.

The embedding judging circuit 22 sequentially, in the order of raster scans for example, takes the pixels making up the image data as pixels of interest stored in the frame memory 21, and judges whether or not added information can be embedded to the pixels of interest.

That is to say, as shown in FIG. 3 for example, in the event that there is a certain pixel D making up image data which is the pixel of interest, the embedding judging circuit 22 reads out the pixel B adjacent thereto in the upper direction, and the pixel C adjacent thereto in the left direction, from the frame memory 21. Then, the embedding judging circuit 22 judges whether or not there is a pixel value of the pixel of interest D between the pixel value of the pixel B (hereafter this may be referred to simply as "pixel value B") and the pixel value of the pixel C. In the event that there is a pixel value D between the pixel value B and the pixel value C, the embedding judging circuit 22 judges that embedding to the pixel of interest D is possible, and in the event that this does not exist, judgment is made that embedding to the pixel of interest D is not possible. The judgment results regarding whether or not embedding to the pixel of interest can be made, judged by the embedding judging circuit 22, is supplied to the predictor selecting circuit 23 as an embedding judging signal.

In the event that the predictor selecting circuit 23 receives an embedding judging signal from the embedding judging circuit 22 to the effect that embedding can be made to the pixel of interest, the predictor selecting circuit 23 selects a prediction method for predicting (performing prediction encoding) of the pixel of interest, based on the added information supplied thereto, and outputs a predictor selection signal representing the selection results to the switch 24. Also, in the event that the predictor selecting circuit 23 receives an embedding judging signal from the embedding judging circuit 22 to the effect that embedding cannot be made to the pixel of interest, the predictor selecting circuit 23 selects a prediction method for predicting (performing prediction encoding) of the pixel of interest, based on the magnitude relation of the pixel of interest D stored in the frame memory 21, and the pixel B adjacent thereto in the upper direction and the pixel C adjacent thereto in the left direction, and supplies a predictor selecting signal representing the selection results thereof to the switch 24.

The switch 24 selects one or the other of terminals 24A and 24B, according to the predictor selecting signal from the predictor selecting circuit 23, and accordingly, the image data stored in the frame memory 21 is supplied to either the predictor 25A or predictor 25B.

The predictors 25A and 25B use the image data supplied thereto via the switch 24, to predict a prediction value for the pixel of interest, with a predetermined prediction method, and this is supplied to a prediction margin of error calculating circuit 26. The predictors 25A and 25B are arranged so as to predict the prediction value of the pixel of interest with different prediction methods.

That is, the predictor 25A predicts, for example, the pixel of interest with a prediction method wherein the pixel; adjacent to the pixel of interest in the upper direction is taken as the prediction value of the pixel of interest. Also, the predictor 25B predicts, for example, the pixel of interest with a prediction method wherein the pixel; adjacent to the pixel of interest in the left direction is taken as the prediction value of the pixel of interest. Accordingly, in the event of taking the pixel D in FIG. 3 as the pixel of interest, the pixel B is obtained as the prediction value of the pixel of interest D with the predictor 25A, and the pixel C is obtained as the prediction value of the pixel of interest D with the predictor 25B.

The prediction margin of error calculating circuit 26 obtains the prediction margin of error of the prediction value of the pixel of interest output from the predictor 25A or 25B, and supplies this to the prediction margin of error saving memory 27. That is to say, the prediction margin of error calculating circuit 26 subtracts the prediction value of the pixel of interest output from the predictor 25A or 25B from the pixel of interest stored in the frame memory 21, thereby obtaining the pixel prediction margin of error of the prediction value, which is supplied to the prediction margin of error saving memory 27.

The prediction margin of error saving memory 27 stores the pixel prediction margin of error of the prediction value supplied from the prediction margin of error calculating circuit 26 in an address corresponding to the position of that pixel of interest, for example.

In the event that the prediction margin of error for one frame, for example, is stored in the prediction margin of error saving memory 27, the entropy coding circuit 28 reads out the one frame of prediction margin of error and subjects this to entropy coding such as Huffman encoding, and the coded results are output as coded data.

Next, description will be made regarding the relation between whether or not embedding to the pixel of interest is possible, and selection of the prediction method for the pixel of interest.

As described above, according to the present embodiment, judgment is made by the embedding judging circuit 22 regarding whether or not there is the pixel value of the pixel of interest D between the pixel value of the pixel B adjacent thereto in the upper direction, and the pixel value of the pixel C adjacent thereto in the left direction, and in the event that there is, judgment is made that embedding to the pixel of interest D can be made, and in the event that there is not, judgment is made that embedding to the pixel of interest D cannot be made.

Figure 4A:
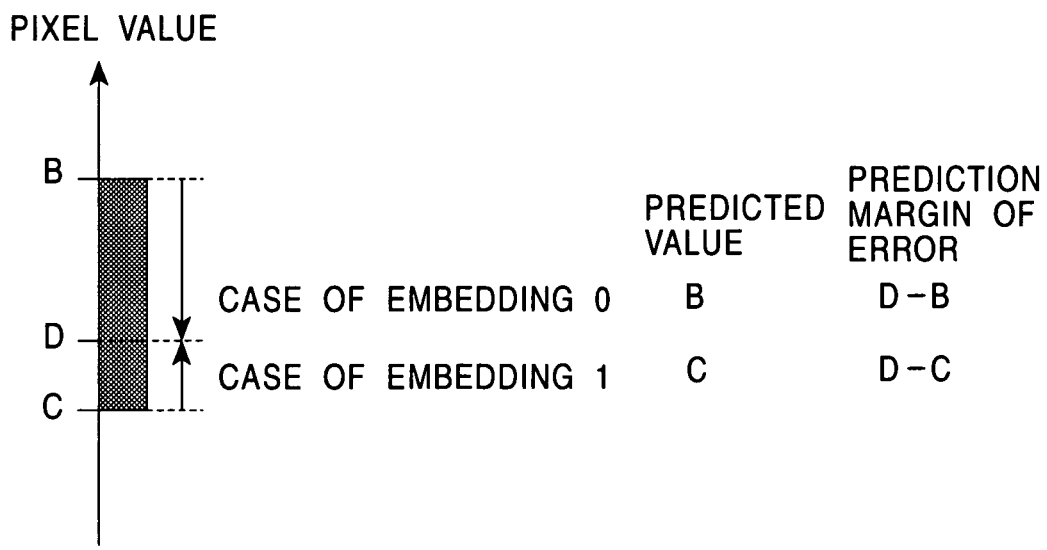
FIGS. 4A and 4B are diagrams illustrating a case wherein added information can be embedded to a pixel of interest.

Accordingly, as shown in FIG. 4A, in the event that the pixel value B is greater than the pixel value C, (i.e., in the event that the pixel value C is smaller than the pixel value B), and further in this case in the event that the pixel value of the pixel of interest D is greater than the pixel value C but smaller than the pixel value B, embedding can be performed to the pixel of interest D. Thus, in the event that embedding can be performed, the prediction method for predicting the pixel of interest is selected at the predictor selecting circuit 23 based on the added information to be embedded therein, as described above. That is, in this case, whether to obtain the prediction value of the pixel of interest with the predictor 25A or the predictor 25B, is selected based on the added information.

Let us say that 1 bit of added information is to be embedded to a pixel, and that for example, the predictor 25A is selected in the event that the one bit of added information is 0, and the predictor 25B is selected in the event that the one bit of added information is 1. In the event that the added information is 0, the predictor selecting circuit 23 outputs a predictor selection signal indicating selection of the terminal 24A connected to the predictor 25A, to the switch 24.

Thus, the switch 24 selects the terminal 24A, and the predictor 25A reads out the pixel B adjacent to the pixel of interest D in the upper direction from the frame memory 21, via the switch 24. Then, the predictor 25A outputs the pixel B to the prediction margin of error calculating circuit 26, as the prediction value of the pixel of interest D. Consequently, at the prediction margin of error calculating circuit 26, D−B, wherein the prediction value B is subtracted from the pixel value of the pixel of interest D, is obtained as the prediction margin of error, and supplied to the prediction margin of error saving memory 27.

On the other hand, in the event that the added information is 1, the predictor selecting circuit 23 outputs a predictor selection signal indicating selection of the terminal 24B connected to the predictor 25B, to the switch 24.

Thus, the switch 24 selects the terminal 24B, and the predictor 25B reads out the pixel C adjacent to the pixel of interest D in the left direction from the frame memory 21, via the switch 24. Then, the predictor 25B outputs the pixel C to the prediction margin of error calculating circuit 26, as the prediction value of the pixel of interest D. Consequently, at the prediction margin of error calculating circuit 26, D−C, wherein the prediction value C is subtracted from the pixel value of the pixel of interest D, is obtained as the prediction margin of error, and supplied to the prediction margin of error saving memory 27.

Figure 4B:
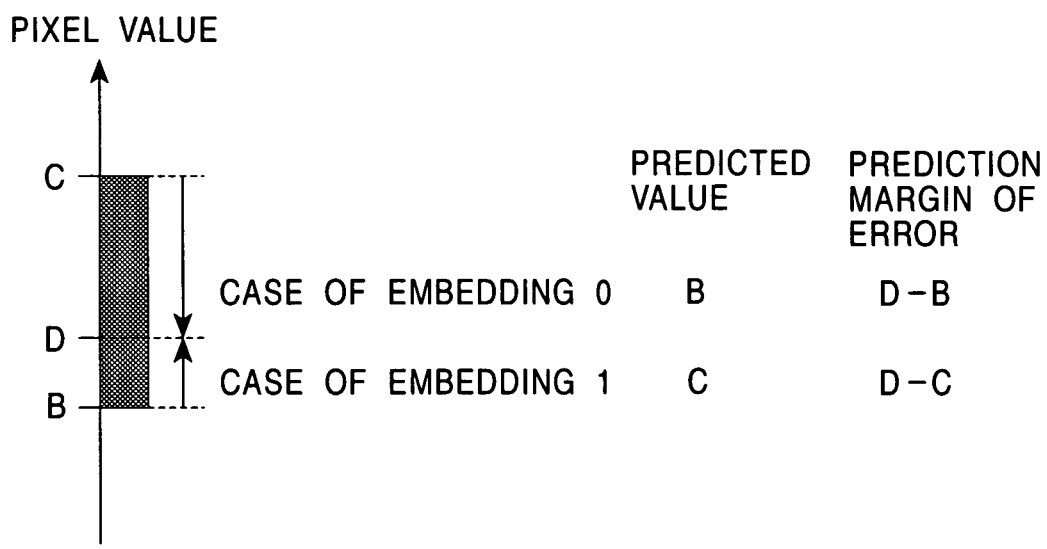

Also, as shown in FIG. 4B, in the event that the pixel value C is greater than the pixel value B, (i.e., in the event that the pixel value B is smaller than the pixel value C), and further in this case in the event that the pixel value of the pixel of interest D is greater than the pixel value B but smaller than the pixel value C, embedding can be performed to the pixel of interest D. In this case as well, processing the same as that described above is performed.

That is, in the event that the added information is 0, the predictor selecting circuit 23 outputs a predictor selection signal indicating selection of the terminal 24A connected to the predictor 25A, to the switch 24, such that the switch 24 selects the terminal 24A. In this case, the predictor 25A reads out the pixel B adjacent to the pixel of interest D in the upper direction from the frame memory 21, via the switch 24, and outputs the pixel B to the prediction margin of error calculating circuit 26, as the prediction value of the pixel of interest D. Consequently, at the prediction margin of error calculating circuit 26, D−B, wherein the prediction value B is subtracted from the pixel value of the pixel of interest D, is obtained as the prediction margin of error, and supplied to the prediction margin of error saving memory 27.

On the other hand, in the event that the added information is 1, the predictor selecting circuit 23 outputs a predictor selection signal indicating selection of the terminal 24B connected to the predictor 25B, to the switch 24, such that the switch 24 selects the terminal 24B. In this case, the predictor 25B reads out the pixel C adjacent to the pixel of interest D in the left direction from the frame memory 21, via the switch 24, and outputs the pixel C to the prediction margin of error calculating circuit 26, as the prediction value of the pixel of interest D. Consequently, at the prediction margin of error calculating circuit 26, D−C, wherein the prediction value C is subtracted from the pixel value of the pixel of interest D, is obtained as the prediction margin of error, and supplied to the prediction margin of error saving memory 27.

The above description relates to a case of a prediction method selecting method wherein embedding to the pixel of interest can be performed, but in the event that embedding to the pixel of interest cannot be performed, the prediction method is selected as described next.

That is, in the event that the pixel value of the pixel of interest D does not exist between the pixel value of the pixel B adjacent thereto in the upper direction, and the pixel value of the pixel C adjacent thereto in the left direction, judgment is made at the embedding judging circuit 22 that embedding to the pixel of interest D cannot be made. Accordingly, in the event that, for example, the pixel value B is greater than the pixel value C and further the pixel value D of the pixel of interest is greater than the pixel value B, as shown in FIG. 5A, or in the event that the pixel value C is greater than the pixel value B and further the pixel value D of the pixel of interest is greater than the pixel value C, as shown in FIG. 5B, judgment is made that embedding cannot be performed.

In the event that embedding cannot be performed, the predictor selecting circuit 23 selects a prediction method for predicting of the pixel of interest, based on the magnitude relation of the pixel of interest D stored in the frame memory 21, and the pixel B adjacent thereto in the upper direction and the pixel C adjacent thereto in the left direction, as described above. That is, in this case, the predictor selecting circuit 23 selects, for example, the prediction method wherein the prediction margin of error is greater.

Figure 5A:
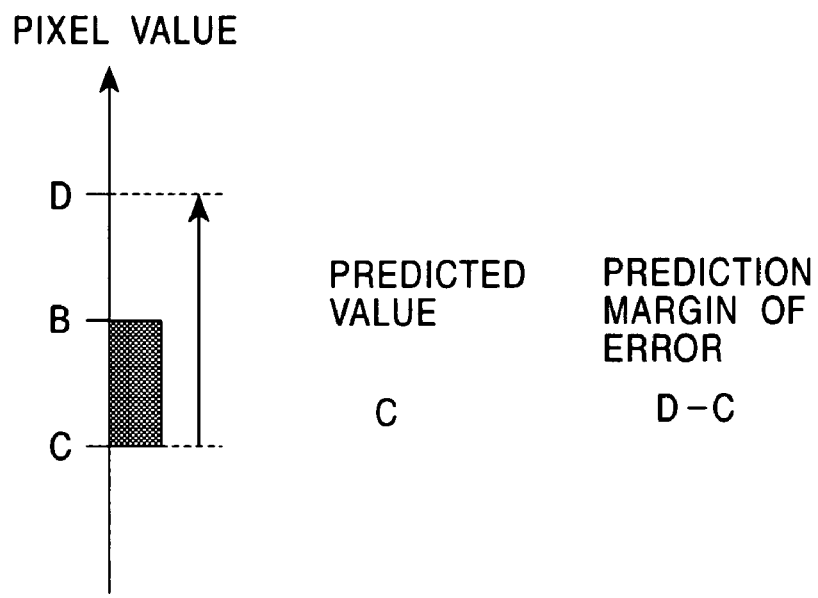
FIGS. 5A and 5B are diagrams illustrating a case wherein added information cannot be embedded to a pixel of interest.
Figure 5B:
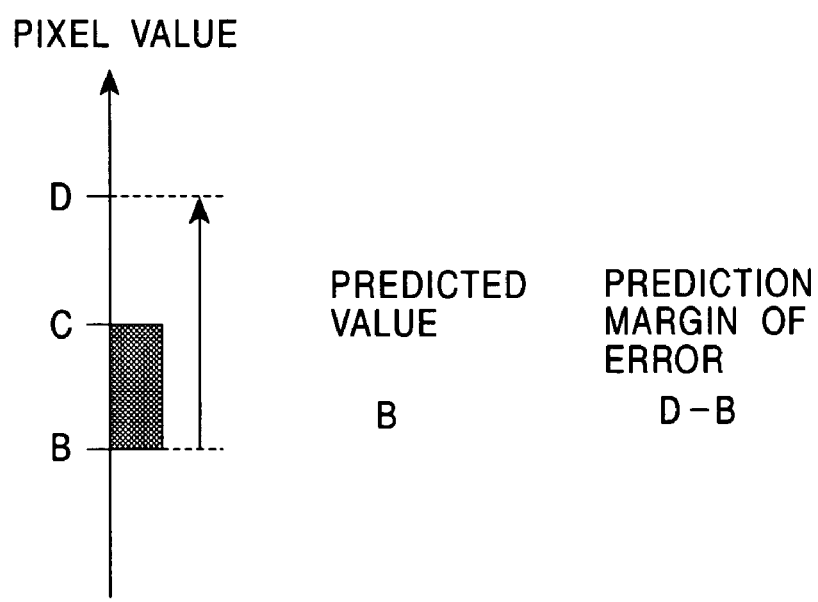

Accordingly, in the case shown in FIG. 5A for example, the prediction margin of error is greater with the prediction value of the pixel of interest D as C rather than B, so the predictor selecting circuit 23 selects the method wherein the pixel C adjacent thereto in the left direction is taken as the prediction value of the pixel of interest D, and a predictor selection signal indicating selection of the terminal 24B connected to the predictor 25B, which performs prediction according to such a prediction method, is output to the switch 24.

Thus, the switch 24 selects the terminal 24B, and the predictor 25B reads out the pixel C adjacent to the pixel of interest D in the left direction from the frame memory 21, via the switch 24. Then, the predictor 25B outputs the pixel value C to the prediction margin of error calculating circuit 26, as the prediction value of the pixel of interest D. Consequently, at the prediction margin of error calculating circuit 26, D−C, wherein the prediction value C is subtracted from the pixel value of the pixel of interest D, is obtained as the prediction margin of error, and supplied to the prediction margin of error saving memory 27.

Also, in the case shown in FIG. 5B for example, the prediction margin of error is greater with the prediction value of the pixel of interest D as B rather than C, so the predictor selecting circuit 23 selects the prediction method wherein the pixel value B adjacent thereto in the upper direction is taken as the prediction value of the pixel of interest D, and a predictor selection signal indicating selection of the terminal 24A connected to the predictor 25A, which performs prediction according to such a prediction method, is output to the switch 24.

Thus, the switch 24 selects the terminal 24A, and the predictor 25A reads out the pixel B adjacent to the pixel of interest D in the upper direction from the frame memory 21, via the switch 24. Then, the predictor 25A outputs the pixel B to the prediction margin of error calculating circuit 26, as the prediction value of the pixel of interest D. Consequently, at the prediction margin of error calculating circuit 26, D−B, wherein the prediction value B is subtracted from the pixel value of the pixel of interest D, is obtained as the prediction margin of error, and supplied to the prediction margin of error saving memory 27.

Next, the processing of the embedded compressing coding apparatus 11 shown in FIG. 2 will be described with reference to the flowchart in FIG. 6.

The image data to be coded is sequentially supplied to the frame memory 21, in increments of individual frames, for example, and stored.

At the point that the image data of one frame is stored in the frame memory 21, in step S1, of the pixels making up the picture data stored in the frame memory 21, that not set as pixel of interest is selected as the pixel of interest, in the order of raster scan.

Following selection of the pixel of interest as described above, the flow proceeds to step S2, later-described embedding compression processing is performed on the pixel of interest by the embedding judging circuit 22, predictor selecting circuit 23, predictors 25A and 25B, and the prediction margin of error calculating circuit 26, and the prediction margin of error obtained therefrom for the pixel of interest (the prediction margin of error for the prediction value of the pixel of interest) is supplied from the prediction margin of error calculating circuit 26 to the prediction margin of error saving memory 27.

Then, the flow proceeds to step S3, and judgment is made regarding whether or not processing has been performed for all pixels making up one frame of image data stored in the frame memory 21 as pixel of interest. In step S3, in the event that judgment has been made that all pixels have not been made to be pixel of interest, the flow returns to step S1, and the same processing is repeated.

Also, in step S3, in the event that judgment has been made that all pixels have been made to be the pixel of interest, i.e., in the event that one frame worth of prediction margin of error has been stored in the prediction margin of error saving memory 27, the flow proceeds to step S4, and the entropy coding circuit 28 reads out the one frame worth of prediction margin of error stored in the prediction margin of error saving memory 27, and performs entropy coding. Further, in step S5, the entropy coding circuit 28 outputs the coded data obtained thereby, and ends the processing.

Figure 6:
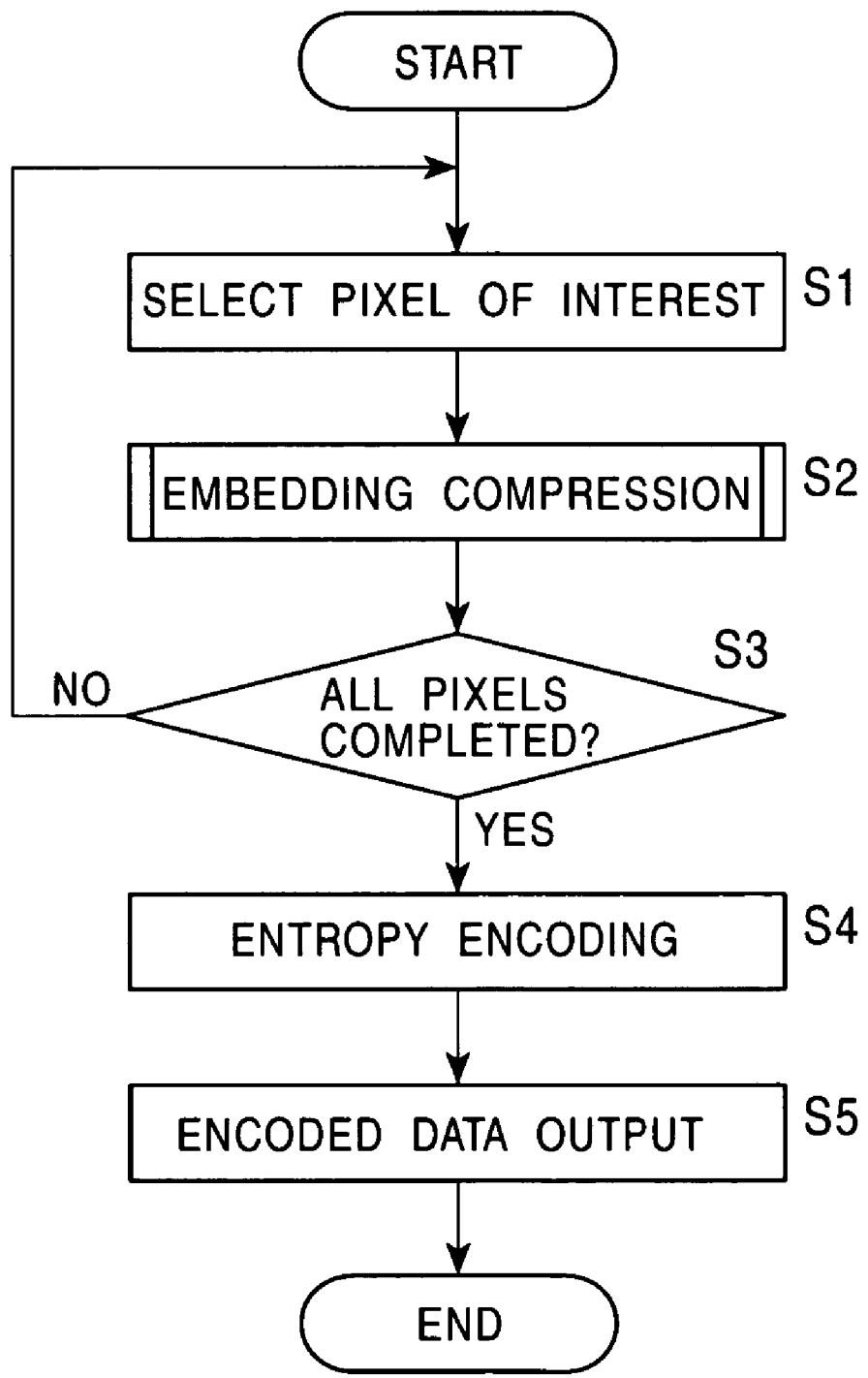
FIG. 6 is a flowchart for describing the processing of the embedded compression coding unit 11 shown in FIG. 2.

Note that the processing in FIG. 6 is performed each time one frame of image data is stored in the frame memory 21, for example.

Figure 7:
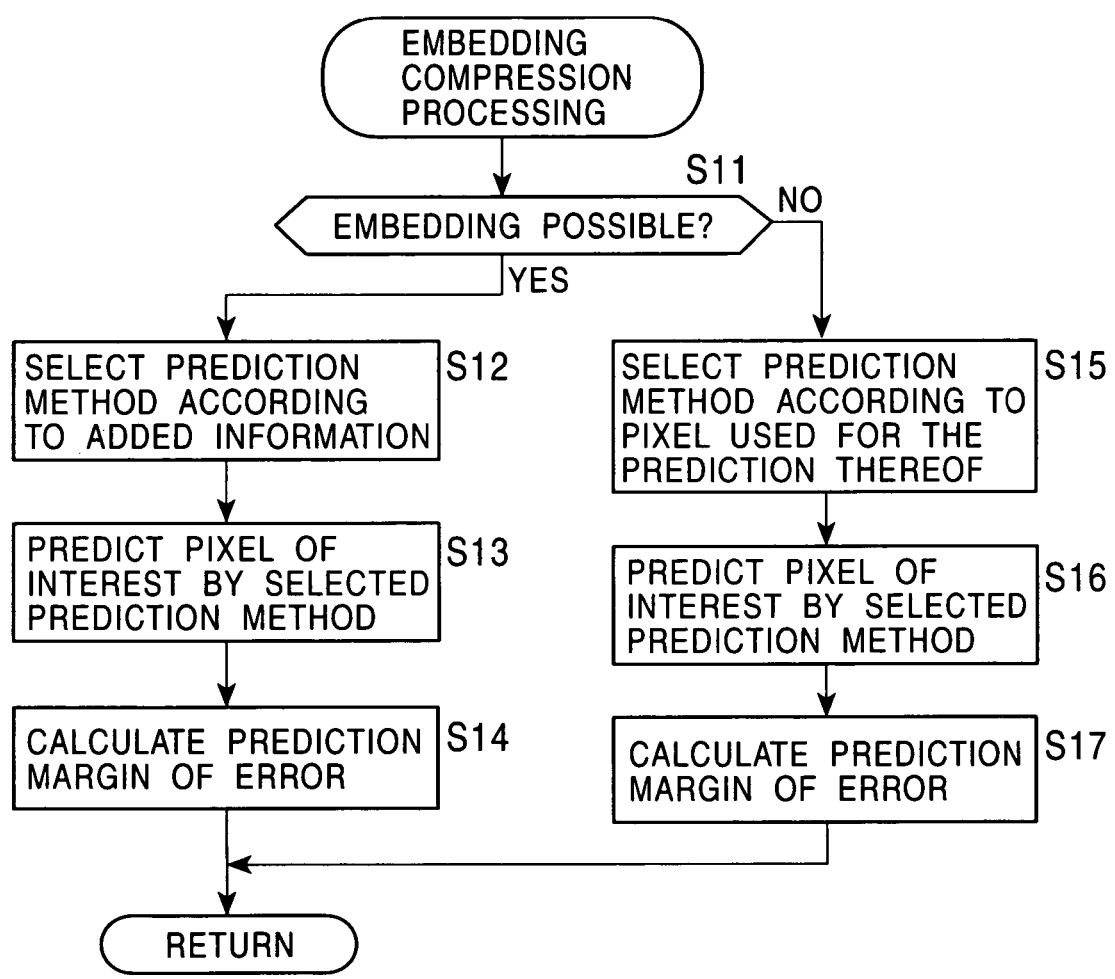
FIG. 7 is a flowchart for describing step S2 in FIG. 6 in further detail.

Next, the embedded compressing processing performed in step S2 of FIG. 6 will be described with reference to the flowchart shown in FIG. 7.

With the embedded compressing processing, first, in step S11, the embedding judging circuit 22 judges whether or not embedding can be made to the pixel of interest. In the event that judgment is made in step S11 that embedding can be made to the pixel of interest, the embedding judging circuit 22 outputs a embedding judging signal to that effect to the predictor selecting circuit 23, and the flow proceeds to step S12.

In step S12, the predictor selecting circuit 23 selects the prediction method based on the added information to be embedded to the pixel of interest, and a predictor selecting signal as the selection results thereof is output to the switch 24. Thus, the switch 24 selects from terminal 24A and 24B the one which is connected to the predictor where prediction according to the selected prediction method is performed.

Then, the flow proceeds to step S13, the prediction value of the pixel of interest is obtained by the selected prediction method at the predictor 25A or 25B where prediction of the selected prediction method is to be performed (also referred to as "selected predictor"), and the prediction value is output to the prediction margin of error calculating circuit 26.

In step S14, the prediction margin of error calculating circuit 26 calculates the prediction margin of error of the prediction value from the selected predictor, stores this in the prediction margin of error saving memory 27, and returns.

On the other hand, in step S11, in the event that judgment is made that embedding to the pixel of interest is not possible, the embedding judging circuit 22 outputs an embedding judging signal to that effect to the predictor selecting circuit 23, and proceeds to step S15.

In step S15, the predictor selecting circuit 23 selects the prediction method for predicting the pixel of interest, based on the pixel of interest, and the pixels to be used for the prediction thereof. That is, as shown in FIG. 3, the predictor selecting circuit 23 selects either a prediction method which takes the pixel value B adjacent to the pixel of interest D in the upper direction as the prediction value, or a prediction method which takes the pixel C adjacent thereto in the left direction as the prediction value, whichever has a greater prediction margin of error, and outputs a predictor selecting signal serving as the selection results thereof to the switch 24. Thus, the switch 24 selects from terminal 24A and 24B the one which is connected to the predictor where prediction according to the selected prediction method is performed.

Then, the flow proceeds to step S16, the prediction value of the pixel of interest is obtained by the selected prediction method at the predictor selected from one or the other of the predictors 25A or 25B where prediction of the selected prediction method is to be performed (selected predictor), and the prediction value is output to the prediction margin of error calculating circuit 26.

In step S17, the prediction margin of error calculating circuit 26 calculates the prediction margin of error of the prediction value from the selected predictor, stores this in the prediction margin of error saving memory 27, and returns.

Figure 8:
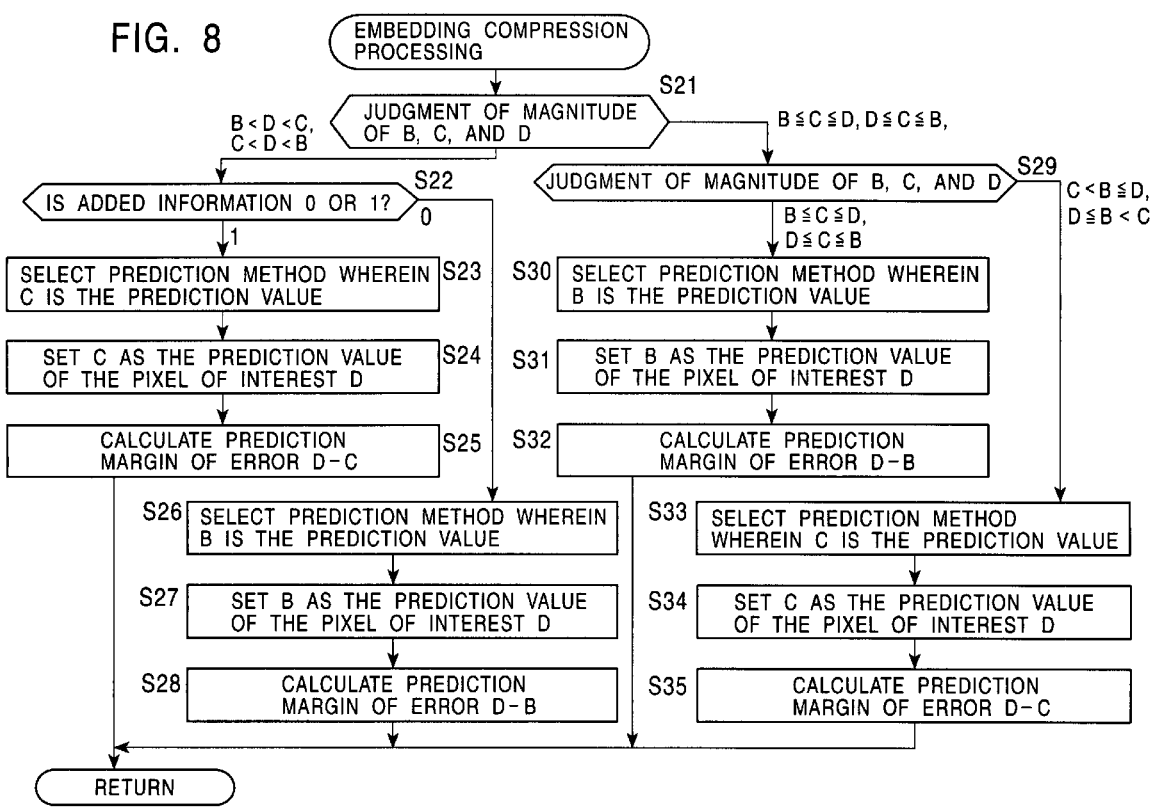
FIG. 8 is a flowchart for describing the processing in step S2 in FIG. 6 in even further detail.

Next, the embedded compressing processing performed in step S2 of FIG. 6 in the event that pixel D in FIG. 3 is the pixel of interest will be described in further detail with reference to the flowchart shown in FIG. 8.

With the embedded compressing processing, first, in step S21, the embedding judging circuit 22 judges whether or not embedding can be made to the pixel of interest, based on the magnitude relation of the pixel of interest D, the pixel value B adjacent thereto in the upper direction, and the pixel C adjacent thereto in the left direction. The processing in step S21 corresponds to the processing in step S11.

In step S21, in the event judgment is made that the expressions B<D<C or C<D<B hold for the magnitude relation of the pixel values B, C, and D, the embedding judging circuit 22 outputs a embedding judging signal, to the effect that embedding can be performed to the pixel of interest, to the predictor selecting circuit 23, and the flow proceeds to step S22.

In step S22, the predictor selecting circuit 23 judges whether the added information to be embedded in the pixel of interest D is 0 or 1, and in the event that judgment is made that this is to be 1, the flow proceeds to step S23, where the predictor selecting circuit 23 selects the prediction method wherein the pixel C is used as the prediction value, and outputs a predictor selection signal to that effect to the switch 24. That is to say, with the present embodiment, prediction by the prediction method wherein the pixel C is used as the prediction value is performed at the predictor 25B, so in this case, a predictor selection signal for selecting the terminal 24B connected to the predictor 25B is output from the predictor selecting-circuit 23 to the switch 24. Note that the processing in steps S22 and S23 correspond to the processing in step S12 in FIG. 7.

The switch 24 selects the terminal 24B according to the predictor selecting signal from the predictor selecting circuit 23, and thus in step S24 the predictor 25B reads out the pixel value C from the frame memory 21 via the switch 24, and outputs this to the prediction margin of error calculating circuit 26 as the prediction value of the pixel of interest D. Note that the processing in step S24 corresponds to the processing in step S13 in FIG. 7.

In step S25, the prediction margin of error calculating circuit 26 obtains the prediction margin of error D−C for the prediction value C from the predictor 25B, supplies this to the prediction margin of error saving memory 27, and returns. Note that the processing in step S24 corresponds to step S14 in FIG. 7.

On the other hand, in step S22, in the event that the added information to be embedded in the pixel of interest D is to be 0, the flow proceeds to step S26, where the predictor selecting circuit 23 selects the prediction method wherein the pixel B is used as the prediction value, and outputs a predictor selection signal to that effect to the switch 24. That is to say, with the present embodiment, prediction by the prediction method wherein the pixel B is used as the prediction value is performed at the predictor 25A, so in this case, a predictor selection signal for selecting the terminal 24A connected to the predictor 25A is output from the predictor selecting circuit 23 to the switch 24. Note that the processing in steps S22 and S26 correspond to the processing in step S12 in FIG. 7.

The switch 24 selects the terminal 24A according to the predictor selecting signal from the predictor selecting circuit 23, and thus in step S27 the predictor 25A reads out the pixel B from the frame memory 21 via the switch 24, and outputs this to the prediction margin of error calculating circuit 26 as the prediction value of the pixel of interest D. Note that the processing in step S27 corresponds to the processing in step S13 in FIG. 7.

In step S28, the prediction margin of error calculating circuit 26 obtains the prediction margin of error D−B for the prediction value B from the predictor 25A, supplies this to the prediction margin of error saving memory 27, and returns. Note that the processing in step S28 corresponds to the processing in step S14 shown in FIG. 7.

On the other hand, in step S21, in the event judgment is made that neither of the expressions B<D<C or C<D<B hold for the magnitude relation of the pixel values B, C, and D, i.e., in the event that one of the expressions $B \leq C \leq D$, $D \leq C \leq B$, $C \leq B \leq D$, or $D \leq B \leq C$ hold, the embedding judging circuit 22 outputs a embedding judging signal to the effect that that embedding to the pixel of interest D is not possible to the predictor selecting circuit 23, and the flow proceeds to step S29.

In step S29, the predictor selecting circuit 23 reads out the pixels B, C, and D from the frame memory 21, and judges the magnitude relation of the pixel values.

In step S29, in the event judgment is made that one of the expressions $B \leq C \leq D$ or $D \leq C \leq B$ holds for the magnitude relation of the pixel values B, C, and D, the flow proceeds to step S30, and the predictor selecting circuit 23 selects the prediction method wherein the pixel value B is used as the prediction value, and outputs a predictor selection signal to that effect to the switch 24. Accordingly, in this case, in the same way as with step S26, the switch 24 selects the terminal 24A. Note that the processing in steps S29 and S30 correspond to the processing in step S15 in FIG. 7.

Now, as described above, in the event that embedding to the pixel of interest is not possible, the prediction method of the pixel of interest wherein the prediction margin of error is greater, is selected. In the event that $B \leq C \leq D$ or $D \leq C \leq B$ holds, of the prediction methods wherein the pixel values B and C are respectively used as prediction values, the prediction method wherein the pixel value B is used as the prediction value yields a greater prediction margin of error, and according this is the prediction method selected in step S30.

Once the switch 24 selects the terminal 24A, in step S31 the predictor 25A reads out the pixel value B from the frame memory 21 via the switch 24, and outputs this to the prediction margin of error calculating circuit 26 as the prediction value of the pixel of interest D. Note that the processing in step S31 corresponds to the processing in step S16 in FIG. 7.

In step S32, the prediction margin of error calculating circuit 26 obtains the prediction margin of error D−B for the prediction value B from the predictor 25A, supplies this to the prediction margin of error saving memory 27, and returns. Note that the processing in step S32 corresponds to the processing in step S17 in FIG. 7.

On the other hand, in step S29, in the event judgment is made that one of the expressions $C<B \leq D$ or $D \leq B<C$ holds for the magnitude relation of the pixel values B, C, and D, the flow proceeds to step S33, and the predictor selecting circuit 23 selects the prediction method wherein the pixel C is used as the prediction value, and outputs a predictor selection signal to that effect to the switch 24. Accordingly, in this case, in the same way as with step S23, the switch 324 selects the terminal 24B. Note that the processing in steps S29 and S33 correspond to the processing in step S15 in FIG. 7.

Now, as described above, in the event that embedding to the pixel of interest is not possible, the prediction method of the pixel of interest wherein the prediction margin of error is greater, is selected. In the event that the expressions $C<B \leq D$ or $D \leq B<C$ hold, of the prediction methods wherein the pixel values B and C are respectively used as prediction values, the prediction method wherein the pixel value C is used as the prediction value yields a greater prediction margin of error, and according this is the prediction method selected in step S33.

Once the switch 24 selects the terminal 24B, in step S34 the predictor 25B reads out the pixel value C from the frame memory 21 via the switch 24, and outputs this to the prediction margin of error calculating circuit 26 as the prediction value of the pixel of interest D. Note that the processing in step S34 corresponds to the processing in step S16 in FIG. 7.

In step S35, the prediction margin of error calculating circuit 26 obtains the prediction margin of error D−C for the prediction value C from the predictor 25B, supplies this to the prediction margin of error saving memory 27, and returns. Note that the processing in step S35 corresponds to the processing in step S17 in FIG. 7.

Now, FIG. 9 shows the rules for embedding compressing processing based on the magnitude relation of the pixel values B, C, and D.

Incidentally, in the cases described above, the arrangement was described such that no embedding is performed in the event that the pixels B and C (i.e., the pixel values thereof) agree, but an arrangement may be made in the event that the pixels B and C agree, wherein, a shown in FIG. 3, the pixel A to the upper left of the pixel of interest D is used, and the added information is embedded in the pixel of interest D. The embedding compressing processing rules for this arrangement are shown in FIG. 10.

Here, in FIG. 10, the pixels A or B are used as the prediction value of the pixel of interest D in the event that B=C holds, but B and C are equal, so pixels A or C may be used as the prediction value of the pixel of interest D.

Figure 11:
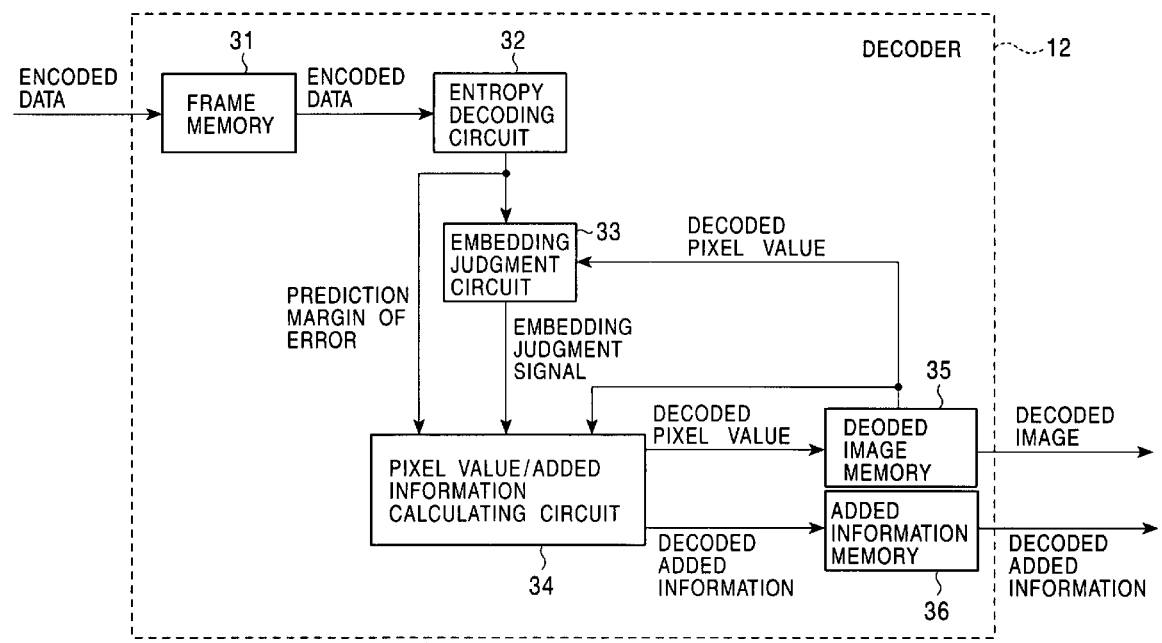
FIG. 11 is a block diagram illustrating a configuration example of the decoding unit 12 shown in FIG. 1.

Next, FIG. 11 shows a configuration example of the decoding unit 12 shown in FIG. 1.

The coded data which the embedded compressing coding apparatus 11 outputs and is supplied via the recording medium 3 or the transmission medium 4 is input to the frame memory 31, and the frame memory 31 sequentially stores the coded data input thereto in increments of individual frames, for example.

The entropy decoding circuit 32 sequentially reads out and performs entropy decoding of coded data stored in the frame memory 31, and thus decodes the coded data into prediction margin of error. This prediction margin of error is supplied to the embedding judging circuit 33 and the pixel value/added information calculating circuit 34.

The embedding judging circuit 33 judges whether or not added information is embedded in a pixel which takes the prediction margin of error from the entropy decoding circuit 32 as the pixel value thereof. That is, the embedding judging circuit 33 sequentially takes pixels configuring an image made up of prediction margin of error output from the entropy decoding circuit 32 (which hereafter may be referred to as "prediction margin of error image") as pixels of interest, in raster scan order for example, and judges whether or not added information has been embedded in the pixels of interest thereof, based on the pixel values of the pixels of interest and the pixel values of the already-decoded pixels, stored in the decoding image memory 35.

Figure 12:
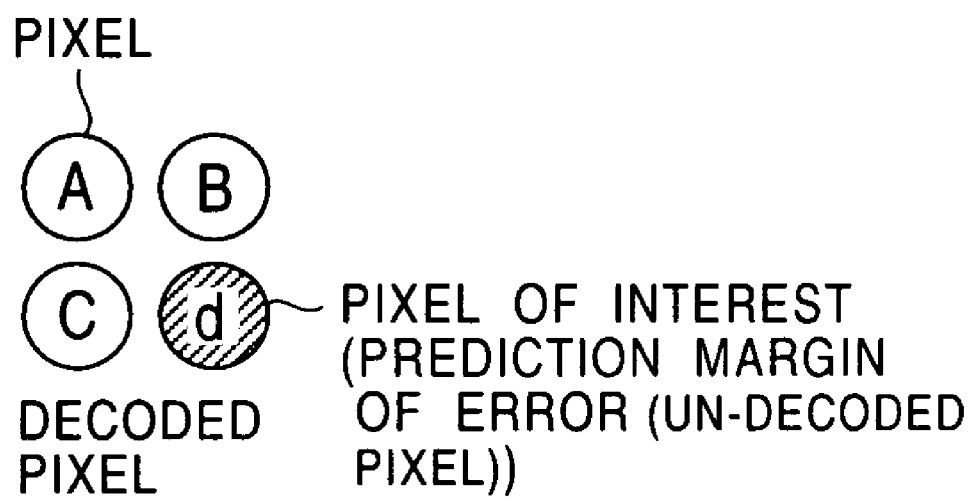
FIG. 12 is a diagram for describing the processing of the embedding judging circuit 33 shown in FIG. 11.

Specifically, for example, as shown in FIG. 12, in the event that a particular pixel d making up a prediction margin of error image is the pixel of interest, the embedding judging circuit 33 reads out the pixel values of the already-decoded pixel B adjacent to the pixel of interest d in the upper direction and the already-decoded pixel C adjacent in the left direction from the decoding image memory 35. Now, pixel decoding is performed in the order of raster scans here, so the pixels in the upper and left directions of the pixel of interest are already decoded. Then, the embedding judging circuit 33 judges whether or not there is embedding of added information to the pixel of interest, with regard to the pixel values B and C, and the pixel value d of the pixel of interest.

That is to say, with the original pixel value of the pixel of interest as D, embedding of added information is performed in the event that the pixel value D exists between the pixel value B adjacent thereto in the upper direction and the pixel C adjacent thereto in the left direction as described above, and in the event that this does not exist, embedding of added information is not performed.

Accordingly, in the event that added information is embedded in the pixel of interest, this means that the magnitude |d| of the pixel value d has to be within the range of |B−C| which is the magnitude of the difference between the pixel values B and C. Accordingly, the embedding judging circuit 33 judges where or not the magnitude |d| of the pixel value d is within the range of |B−C| which is the magnitude of the difference between the pixel values B and C, and in the event that this exists, judgment is made that embedding has been made to the pixel of interest d, and in the event that this does not exist, judgment is made that embedding has not been made to the pixel of interest d. the judging results of the embedding judging circuit 33 regarding whether or not embedding has been made to the pixel of interest are supplied to the pixel value/added information calculating circuit 34 as an embedding judging signal.

In the event that the pixel value/added information calculating circuit 34 receives an embedding judging signal from the embedding judging circuit 33 to the effect that embedding has been made to the pixel of interest, the prediction method which predicted the pixel of interest is judged based on the pixel value of the pixel of interest and the pixel values of pixels already decoded and stored in the decoding image memory 35, and also the pixel of interest is decoded.

That is to say, the pixel value/added information calculating circuit 34 reads out the pixel values of each of the already-decoded pixel B adjacent to the pixel of interest (prediction margin of error) d in the upper direction and the already-decoded-pixel C adjacent in the left direction from the decoding image memory 35, and decodes the pixel of interest d according to the prediction method wherein each are the prediction values of the pixel of interest. Specifically, adding the pixel value B and the pixel value d of the pixel of interest which is the prediction margin of error allows decoding according to a prediction method wherein the pixel value B is the prediction value to be performed, and adding the pixel value C and the pixel value d of the pixel of interest which is the prediction margin of error allows decoding according to a prediction method wherein the pixel value C is the prediction value to be performed.

Upon obtaining B+d which is the added value of the pixel value B and the prediction margin of error d, and C+d which is the added value of the pixel value C and the prediction margin of error d, the pixel value/added information calculating circuit 34 selects the one of the two added values B+d and C+d which exists between the pixel values B and C, and outputs the selected added value to the decoding image memory 35 as the decoded results of the pixel of interest.

That is, in the event that there is added information embedded in the pixel of interest, the original pixel value of the pixel of interest should exist between the pixel values B and C based on what has been described above, and accordingly, the pixel value/added information calculating circuit 34 selects the one of the added values B+d and C+d which exists between the pixel values B and C, and takes the selected added value as the decoded results of the pixel of interest.

Further, in the event that the added value B+d has been taken from the added values B+d and C+d as the decoded results, the pixel value/added information calculating circuit 34 recognizes that the prediction method is that wherein the pixel value B is the prediction value. Also, in the event that the added value C+d has been taken from the added values B+d and C+d as the decoded results, the pixel value/added information calculating circuit 34 recognizes that the prediction method is that wherein the pixel value C is the prediction value. Then, based on the prediction method recognition results, the pixel value/added information calculating circuit 34 decodes the added information embedded in the pixel of interest.

That is, as described above, in the event that the added information is 0, the embedded compressing coding apparatus 11 uses the prediction method wherein the pixel value B is used as the prediction value of the pixel of interest, and in the event that the added information is 1, the embedded compressing coding apparatus 11 uses the prediction method wherein the pixel value C is used as the prediction value of the pixel of interest. Now, in the event that recognition results are obtained to the effect that the prediction method is that wherein the pixel value B is taken as the prediction value, the pixel value/added information calculating circuit 34 decodes 0 as the added information, and in the event that recognition results are obtained to the effect that the prediction method is that wherein the pixel value C is taken as the prediction value, the pixel value/added information calculating circuit 34 decodes 1 as the added information, the added information then being supplied to the added information memory 36.

Figure 13A:
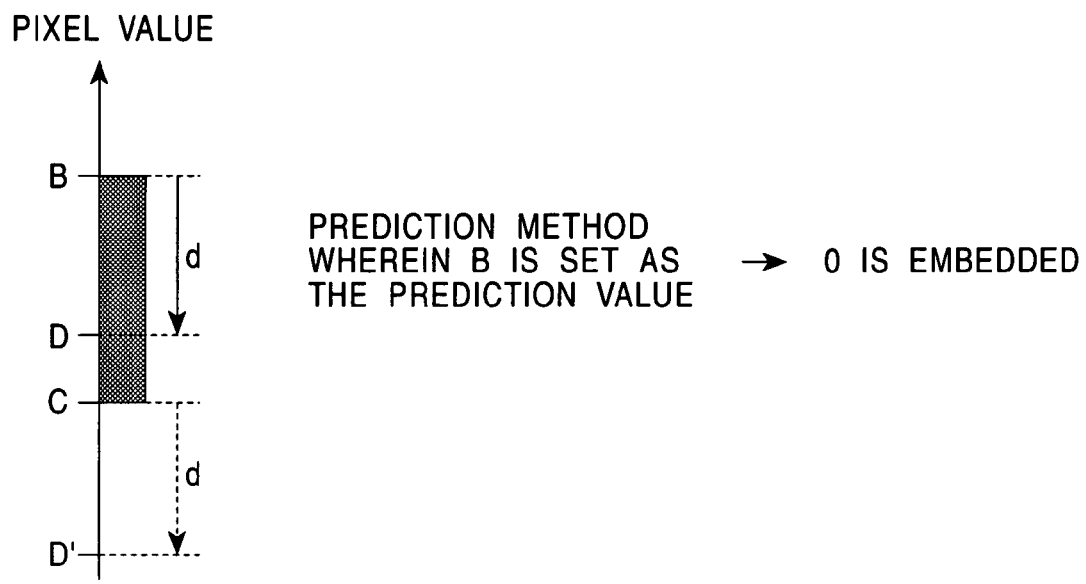
FIGS. 13A and 13B are diagrams describing the decoding method for a pixel and added information in the event that added information has been embedded in that pixel.
Figure 13B:
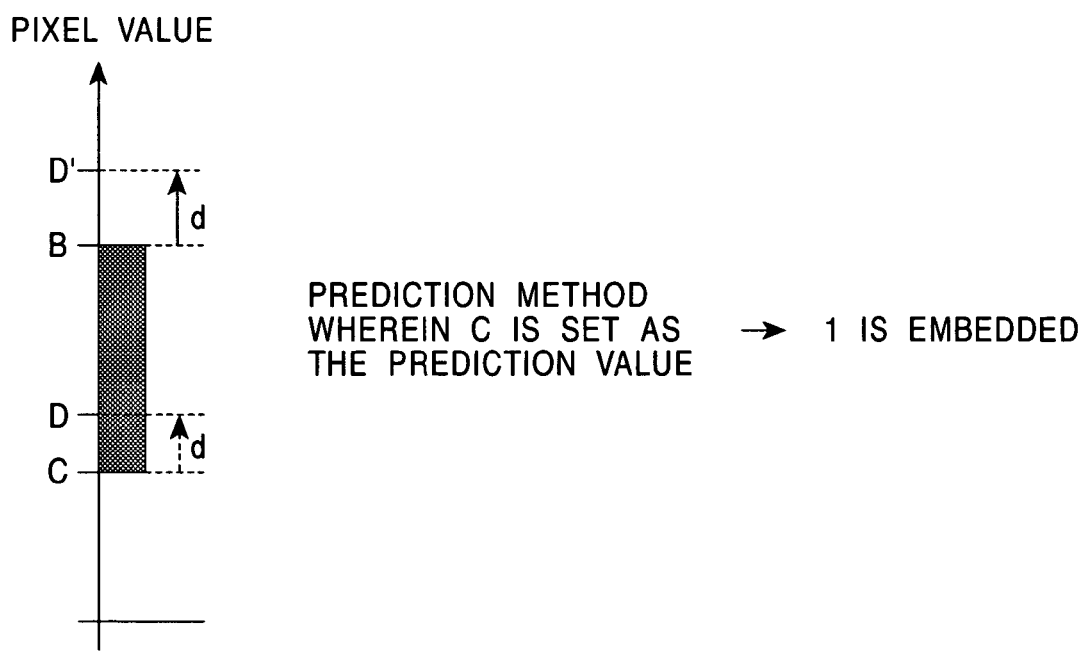

Accordingly, in the event that the relation of the prediction margin of error d, and the pixel values B and C is represented by the expression C<B+d<B, as shown in FIG. 13A for example, B+d is decoded as the pixel value of the pixel of interest, and also 0 is decoded as the added information. Also, in the event that the relation of the prediction margin of error d, and the pixel values B and C is represented by the expression C<C+d<B, as shown in FIG. 13B for example, C+d is decoded as the pixel value of the pixel of interest, and also 1 is decoded as the added information.

On the other hand, in the event that the pixel value/added information calculating circuit 34 receives an embedding judging signal from the embedding judging circuit 33 to the effect that embedding has not been made to the pixel of interest, the pixel of interest is decoded based on pixel value thereof and the pixel values of the already-decoded pixels stored in the decoding image memory 35.

That is, as described above, in the event that the magnitude |d| of the pixel value d of the pixel of interest (prediction margin of error) is not within the range of |B−C| which is the magnitude of the difference between the pixel values B and C, there is no added information embedded in the pixel of interest. Further, in the event that there is no added information embedded in the pixel of interest, the embedded compressing coding apparatus 11 is supposed to have performed prediction of the pixel of interest with the one of the prediction methods of which the pixel values B and C are the respective prediction values wherein the prediction margin of error is greater. Thus, the pixel value/added information calculating circuit 34 decodes the pixel of interest so as to match these selection conditions of the prediction method.

Figure 14:
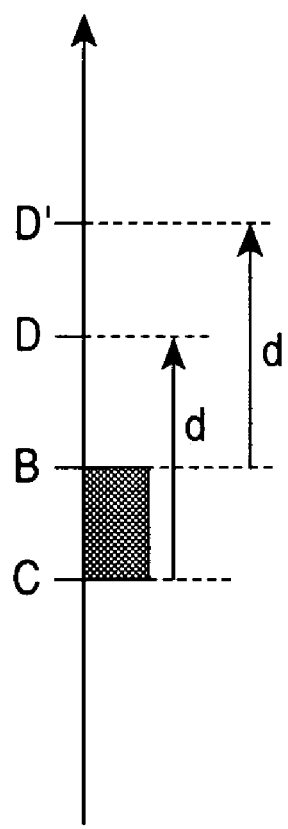
FIG. 14 is a diagram describing the decoding method for a pixel in the event that added information has not been embedded in that pixel.

Specifically, as shown in FIG. 14, in the event that the expression C<B<C+d holds, for example, saying that the pixel of interest d has been predicted with the pixel value B as the prediction value, the decoding results are D'=B+d. However, attempting to make D' to be the correct decoding results of the pixel of interest violates the selection conditions of the predicting methods which say that prediction is to be made with the one of the prediction methods respectively having the pixel values B and C as the prediction values thereof wherein the prediction margin of error is greater. That is to say, in the event that D' is to be taken as the decoded results of the pixel of interest, the pixel of interest should have been predicted with the pixel value C, wherein the prediction margin of error is greater, as the prediction value, and decoded results D' decoded with the pixel value B as the prediction value are not correct decoding results.

Accordingly, the pixel value/added information calculating circuit 34 decodes the pixel of interest according to D=C+d, assuming that the pixel of interest d has been predicted with the pixel value C as the prediction value. In this case, this agrees with the selection conditions of the predicting methods which say that prediction is to be made with the one of the prediction methods respectively having the pixel values B and C as the prediction values thereof wherein the prediction margin of error is greater, so the pixel value/added information calculating circuit 34 takes D as the decoded results of the pixel of interest, and outputs this to the decoding image memory 35.

The decoding image memory 35 temporarily stores the decoded results of the pixel of interest (decoded pixel value) output from the pixel value/added information calculating circuit 34 in an address corresponding to the position of the pixel of interest, for example. The added information memory 36 temporarily stores the decoded results of the added information (decoded added information) output from the pixel value/added information calculating circuit 34.

Next, the processing of the decoding unit 12 shown in FIG. 11 will be described with reference to the flowchart in FIG. 15.

The coded data is sequentially supplied and stored in the frame memory 31, in increments of individual frames, for example.

Once one frame of coded data has been stored in the frame memory 31, in step S41 the entropy decoding circuit 32 performs entropy decoding of the one frame of coded data stored in the frame memory 41, and converts this into a prediction margin of error image comprised of prediction margin of error. Further, the flow proceeds to step S42, and in the event that there is a pixel making up the prediction margin of error image which have not yet been made the pixel of interest in the raster scan order, this is selected as the pixel of interest.

Subsequently, the flow proceeds to step S43, the pixel of interest is decoded at the embedding judging circuit 33 and pixel value/added information calculating circuit 34, and also in the event that there is added information embedded in the pixel of interest, added information extracting/pixel decoding processing is performed wherein the added information is decoded (extracted), and the decoded results of the pixel of interest obtained thereby are stored in the decoding image memory 35 from the pixel value/added information calculating circuit 34. Further, in the event that decoded results of the added information are obtained in step S43, the decoded results are supplied from the pixel value/added information calculating circuit 34 to the added information memory 36 and stored.

Then, the flow proceeds to step S44, and judgment is made regarding whether or not all pixels making up the one frame of prediction margin of error image decoded by the entropy decoding circuit 32, have been processed as pixels of interest. In step S44, in the event that judgement is made that not all pixels have yet been made to be the pixel of interest, the flow returns to step S42, and subsequently the same processing is repeated.

Also, in step S44, in the event that judgement is made that all pixels have been made to be pixel of interest, i.e., in the event that judgment is made that the one frame of decoded image has been stored in the decoding image memory 35 and also the added information embedded in the one frame of decoded image has been stored in the added information memory 36, the flow proceeds to step S45, where the decoded image is read out from the decoding image memory 35 and output, and the added information is also read out from the added information memory 36 and output, thus completing the processing.

Figure 15:
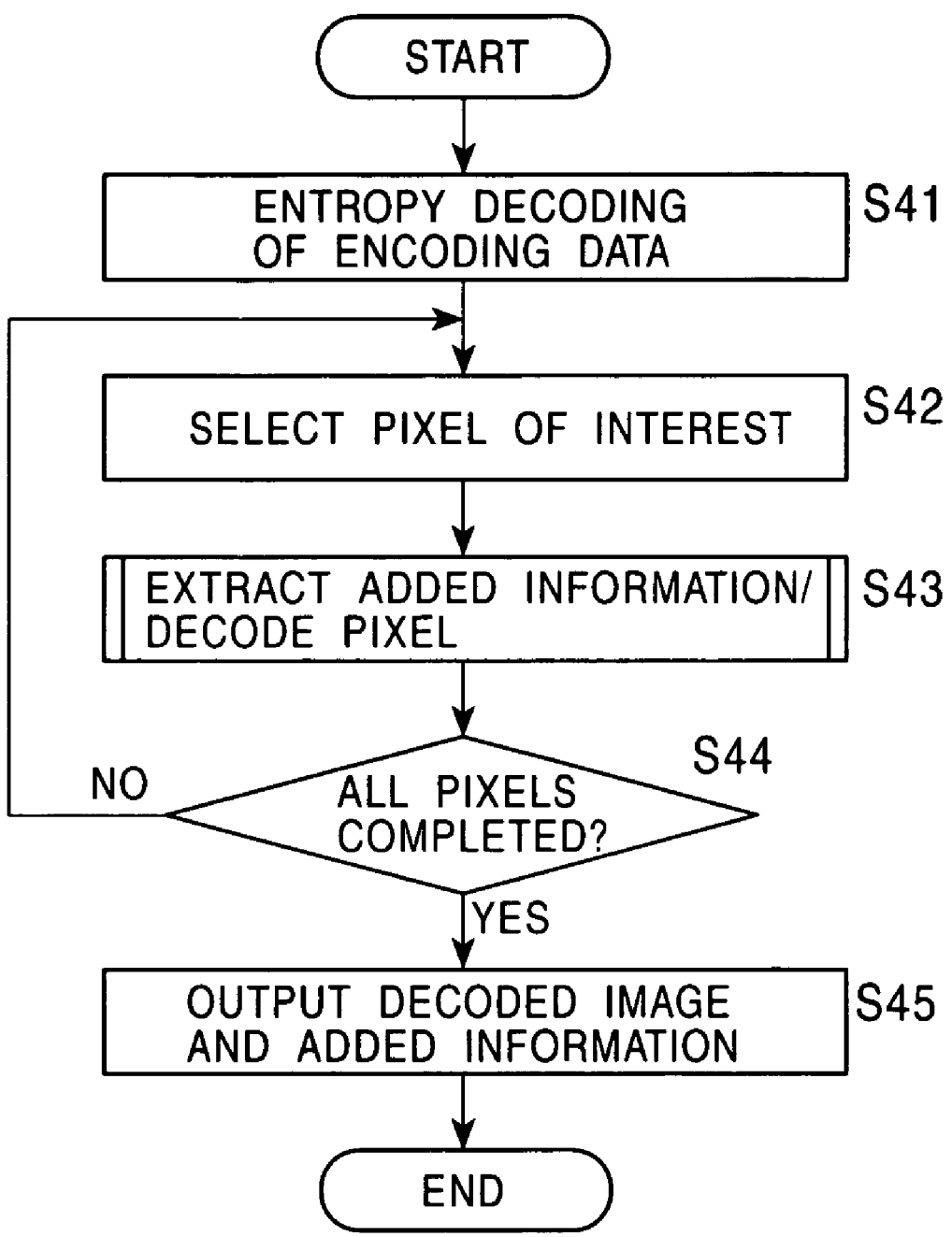
FIG. 15 is a flowchart for describing the processing of the decoding apparatus 12 shown in FIG. 11.

Now, the processing shown in FIG. 15 is performed each time one frame of coded data is stored in the frame memory 31.

Figure 16:
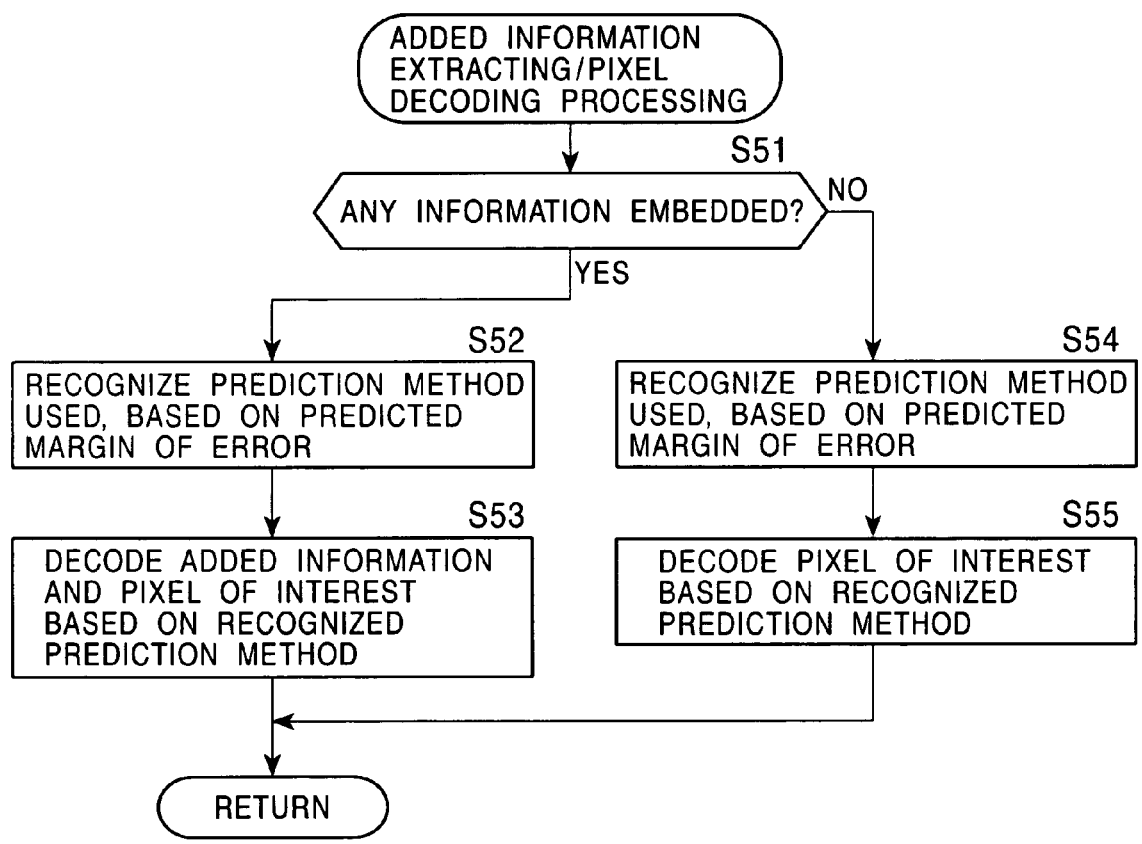
FIG. 16 is a flowchart for describing the processing of step S43 shown in FIG. 15 in further detail.

Next, the added information extracting/pixel decoding processing in step S43 of FIG. 15 will be described with reference to the flowchart in FIG. 16.

With the added information extracting/pixel decoding processing, first, in step S51, the embedding judging circuit 33 judges whether or not there is added information embedded in the pixel of interest. In the event that judgment is made in step S51 that there is added information embedded in the pixel of interest, the embedding judging circuit 33 outputs the embedding judging signal to that effect to the pixel value/added information calculating circuit 34, and the flow proceeds to step S52.

In step S52, the pixel value/added information calculating circuit 34 recognizes the prediction method used for prediction of the pixel of interest, based on the prediction margin of error which is the pixel value of the pixel of interest, and the pixel values of the pixels adjacent to the pixel of interest in the left and upper directions, already decoded and stored in the decoding image memory 35.

Now, with the present embodiment, processing is performed on the raster scan order as described above, which means that the pixels in the upper and left directions of the pixel of interest are already decoded. Incidentally, in the event that the pixel of interest is in the topmost row or in the leftmost column of a frame, there are no pixels adjacent thereto in the left and upper directions. With the present embodiment, the line of the first row and the first column are either uncoded pixel values themselves, or are made to be prediction margins of error predicted with a constant rule. That is, any configuration wherein the pixel values for the first row and the first column can be readily obtained will suffice. Other arrangements include that wherein processing is performed with the decoding unit 12 assuming that a pixel with a pixel value of 0, or a pixel the same as the pixel of interest, exists to the left or above of the pixel of interest. This also holds for the embedded compressing coding apparatus 11.

Following recognition of the prediction method, the pixel value/added information calculating circuit 34 proceeds from step S52 to step S53, and decodes the pixel of interest based on the recognized prediction method, and also decodes the added information embedded therein, and returns.

On the other hand, in the event that judgment is made in step S51 that there is no added information embedded in the pixel of interest, the embedding judging circuit 33 outputs the embedding judging signal to that effect to the pixel value/added information calculating circuit 34, and the flow proceeds to step S54.

In step S54, the pixel value/added information calculating circuit 34 recognizes the prediction method used for prediction of the pixel of interest, based on the prediction margin of error which is the pixel value of the pixel of interest, and the pixel values of the pixels adjacent to the pixel of interest in the left and upper directions, already decoded and stored in the decoding image memory 35, and proceeds to step S55.

In step S55, the pixel value/added information calculating circuit 34 decodes the pixel of interest based on the prediction method recognized in step S54 (i.e., the recognized prediction method), and returns.

Figure 17:
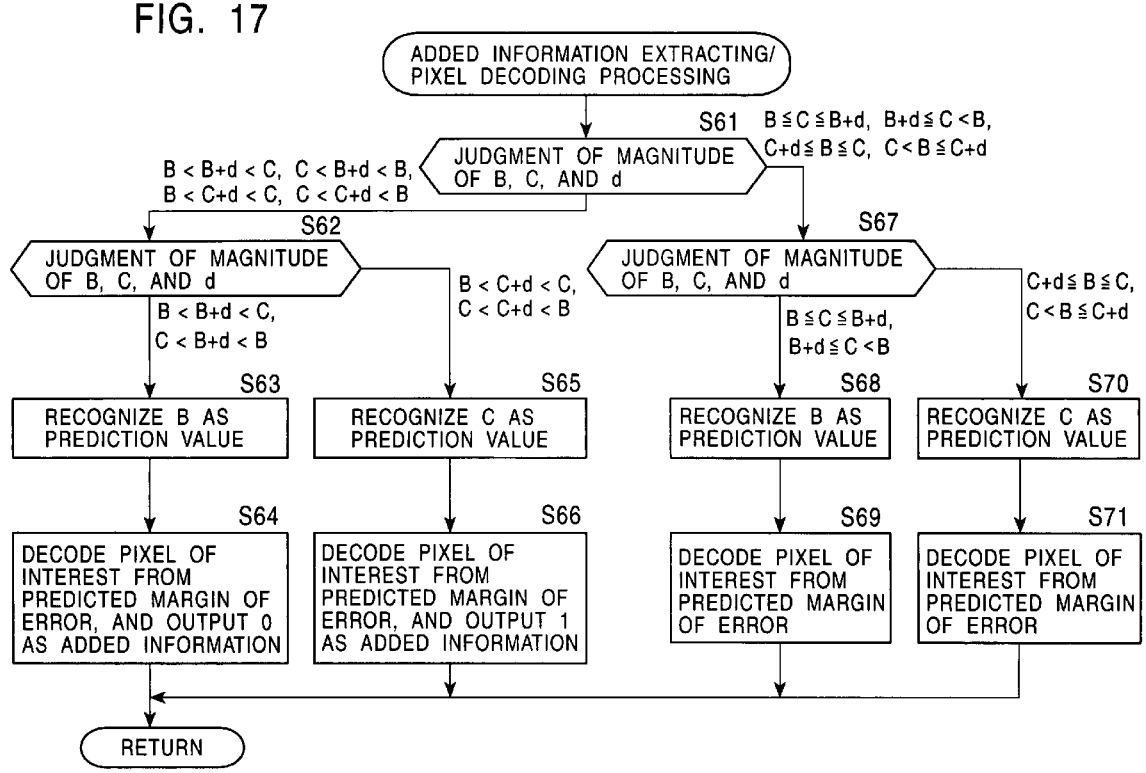
FIG. 17 is a flowchart for describing the processing of step S43 shown in FIG. 15 in even further detail.

Next, making reference to the flowchart in FIG. 17, the added information extracting/pixel decoding processing in step S43 of FIG. 15 in the event that the pixel (predicted margin of error) d shown in FIG. 12 is taken as the pixel of interest will be described in further detail.

With the added information extracting/pixel decoding processing, first, in step S61, the embedding judging circuit 33 judges whether or not there is added information embedded in the pixel of interest, by judging the magnitude relation of the pixel of interest d, the already-decoded pixel value B adjacent thereto in the upper direction, and the already-decoded pixel C adjacent thereto in the left direction. Note that the processing in step S61 corresponds to the processing of step S51 in FIG. 16.

In the processing in step S61, in the event that any of the following expressions hold regarding the magnitude relation of the pixel values B, C, and d, i.e., the expressions B<B+d<C, C<B+d<B, B<C+d<C, or C<C+d<B, the embedding judging circuit 33 outputs an embedding judging signal to the effect that embedding has been performed to the pixel of interest d to the pixel value/added information calculating circuit 34, and the flow proceeds to step S62.

In step S62, the pixel value/added information calculating circuit 34 judges the magnitude relation of the pixel values B, C, and d, and thus recognizes the prediction method used for prediction for the pixel of interest.

That is, in step S62, in the event judgment is made that that either expression B<B+d<C or C<B+d<B hold regarding the magnitude relation of the pixel values B, C, and d, the flow proceeds to step S63, the pixel value/added information calculating circuit 34 recognizes that the prediction method wherein the pixel value B is taken as the prediction value has been used, and the flow proceeds to step S64. Note that the processing of step S62 and S63 correspond to the processing of step S52 in FIG. 16.

In step S64, the pixel value/added information calculating circuit 34 adds the prediction margin of error d which is the pixel value of the pixel of interest, to the pixel value B taken as the prediction value in the recognized prediction method, based on the prediction method recognized in step S63 (i.e., the recognized prediction method), thereby obtaining the pixel value B+d as the decoding results of the pixel of interest, which is output to the decoding image memory 35. Further, based on the recognized prediction method, the pixel value/added information calculating circuit 34 obtains 0 as the decoded results of the added information based on the recognized prediction method, outputs this to the added information memory 36, and returns. Incidentally, the processing of step S64 corresponds to the processing in step S53 in FIG. 16.

Also, in step S62, in the event judgment is made that that either expression B<C+d<C or C<C+d<B hold regarding the magnitude relation of the pixel values B, C, and d, the flow proceeds to step S65, the pixel value/added information calculating circuit 34 recognizes that the prediction method wherein the pixel value C is taken as the prediction value has been used, and the flow proceeds to step S66. Note that the processing of step S62 and S65 correspond to the processing of step S52 in FIG. 16.

In step S66, the pixel value/added information calculating circuit 34 adds the prediction margin of error d which is the pixel value of the pixel of interest, to the pixel value C taken as the prediction value in the recognized prediction method, based on the prediction method recognized in step S65 (i.e., the recognized prediction method), thereby obtaining the pixel value C+d as the decoding results of the pixel of interest, which is output to the decoding image memory 35. Further, based on the recognized prediction method, the pixel value/added information calculating circuit 34 obtains 1 as the decoded results of the added information based on the recognized prediction method, outputs this to the added information memory 36, and returns. Incidentally, the processing of step S66 corresponds to the processing in step S53 in FIG. 16.

On the other hand, in step S61, in the event that none of the following expressions hold regarding the magnitude relation of the pixel values B, C, and d, i.e., the expressions B<B+d<C, C<B+d<B, B<C+d<C, or C<C+d<B, that is to say, in the event that any of the following expressions hold, i.e., the expressions B≦C≦B+d, B+d≦C<B, C+d≦B≦C, or C<B≦C+d, the embedding judging circuit 33 outputs an embedding judging signal to the effect that embedding has not been performed regarding the pixel of interest d to the pixel value/added information calculating circuit 34, and the flow proceeds to step S67.

In step S67, the pixel value/added information calculating circuit 34 judges the magnitude relation of the pixel values B, C, and d, and thus recognizes the prediction method used for prediction for the pixel of interest.

In step S67, in the event judgment is made that that either expression B≦C≦B+d or B+d≦C≦B hold regarding the magnitude relation of the pixel values B, C, and d, the flow proceeds to step S68, the pixel value/added information calculating circuit 34 recognizes that the prediction method wherein the pixel value B is taken as the prediction value has been used, and the flow proceeds to step S69. Note that the processing of step S67 and S68 correspond to the processing of step S54 in FIG. 16.

In step S69, the pixel value/added information calculating circuit 34 adds the prediction margin of error d which is the pixel value of the pixel of interest, to the pixel value B taken as the prediction value in the recognized prediction method, based on the prediction method recognized in step S68 (i.e., the recognized prediction method), thereby obtaining the pixel value B+d as the decoding results of the pixel of interest, which is output to the decoding image memory 35, and the flow returns. Note that the processing of step S69 corresponds to the processing in step S55 in FIG. 16.

Also, in step S67, in the event judgment is made that that either expression C+d≦B≦C or C<B≦C+d hold regarding the magnitude relation of the pixel values B, C, and d, the flow proceeds to step S70, the pixel value/added information calculating circuit 34 recognizes that the prediction method wherein the pixel value C is taken as the prediction value has been used, and the flow proceeds to step S71. Note that the processing of step S67 and S70 correspond to the processing of step S54 in FIG. 16.

In step S71, the pixel value/added information calculating circuit 34 adds the prediction margin of error d which is the pixel value of the pixel of interest, to the pixel value C taken as the prediction value in the recognized prediction method, based on the prediction method recognized in step S70 (i.e., the recognized prediction method), thereby obtaining the pixel value C+d as the decoding results of the pixel of interest, which is output to the decoding image memory 35, and the flow returns. Note that the processing of step S71 corresponds to the processing in step S55 in FIG. 16.

Now, FIG. 18 shows the rules for decoding processing of coded data based on the magnitude relation of the pixel values B, C, and D.

Incidentally, as shown in FIG. 10, with the pixel B and C agreeing, in the event that the pixel A to the upper left of the pixel of interest is used for embedding information to the pixel of interest, decoding of the pixel value and the added information can be performed using the same pixel A to the upper left, and the rules for decoding processing in this case are shown in FIG. 19.

As described above, the arrangement has been made such that the prediction method to be used for predicting the pixel of interest is selected based on added information, and the pixel of interest is predicted based on the selected prediction method, thereby obtaining the prediction margin of error of the prediction value, so that the prediction margin of error can be decoded into the original pixel value and added information by recognizing the prediction method used for the prediction thereof. That is, with the decoding unit 12, coded data can be decoded into the original image (an image without deterioration in image quality) and added information, without any overhead for decoding. From the perspective of the embedded compressing coding apparatus 11, this means that completely reversible compression coding can be performed without overhead.

Now, in the above arrangement, added information is embedded to the pixel of interest D only in the event that the expression |B−C|>|d| holds, wherein d represents the prediction margin of error of the prediction value of the pixel of interest D, but arrangements can also be made wherein added information is embedded to the pixel of interest D even in the event that the expression |B−C|= |d| holds. However, in this case, in the event that the pixel value of the pixel of interest is the same as the pixel value B or C and also the prediction margin of error d is 0, it becomes difficult for the decoding unit 12 to judge which pixel value B or C has been used as the prediction value of the pixel of interest (i.e., to perform recognition of the prediction method used). Accordingly, with the present embodiment, added information is not embedded to the pixel of interest in the event that the expression |B−C|=|d| holds.

Also, with the present embodiment, in the event that added information is not embedded in the pixel of interest D, the pixel value B or C of which the prediction margin of error d is greater is to be used as the prediction value for the pixel of interest D, due to the following reason. With the present embodiment, added information is embedded to the pixel of interest D only in the event that the expression |B−C|>|d| holds, and further, the embedding is performed by selecting the prediction method to be used for the prediction of the pixel of interest , based on the added information. Accordingly, in the event that added information is not embedded, using the pixel value B or C having the smaller prediction margin of error d as the prediction value of the pixel of interest D results in the expression |B−C|>|d| holding, which would make it difficult of the decoding unit 12 to judge whether or not there is added information embedded in the pixel of interest.

Figure 20:
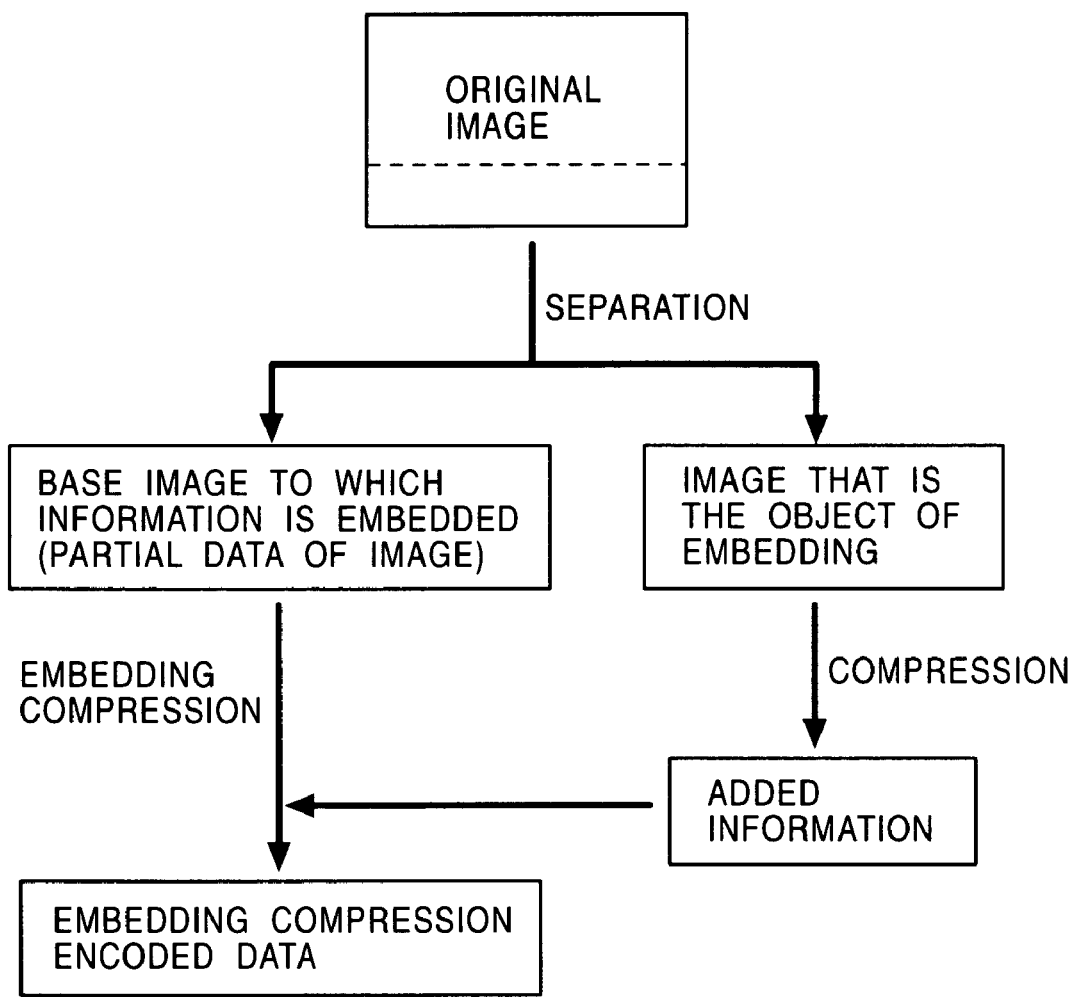
FIG. 20 is a diagram for describing the processing for embedding in a part of an image, the remainder thereof.
Figure 21:
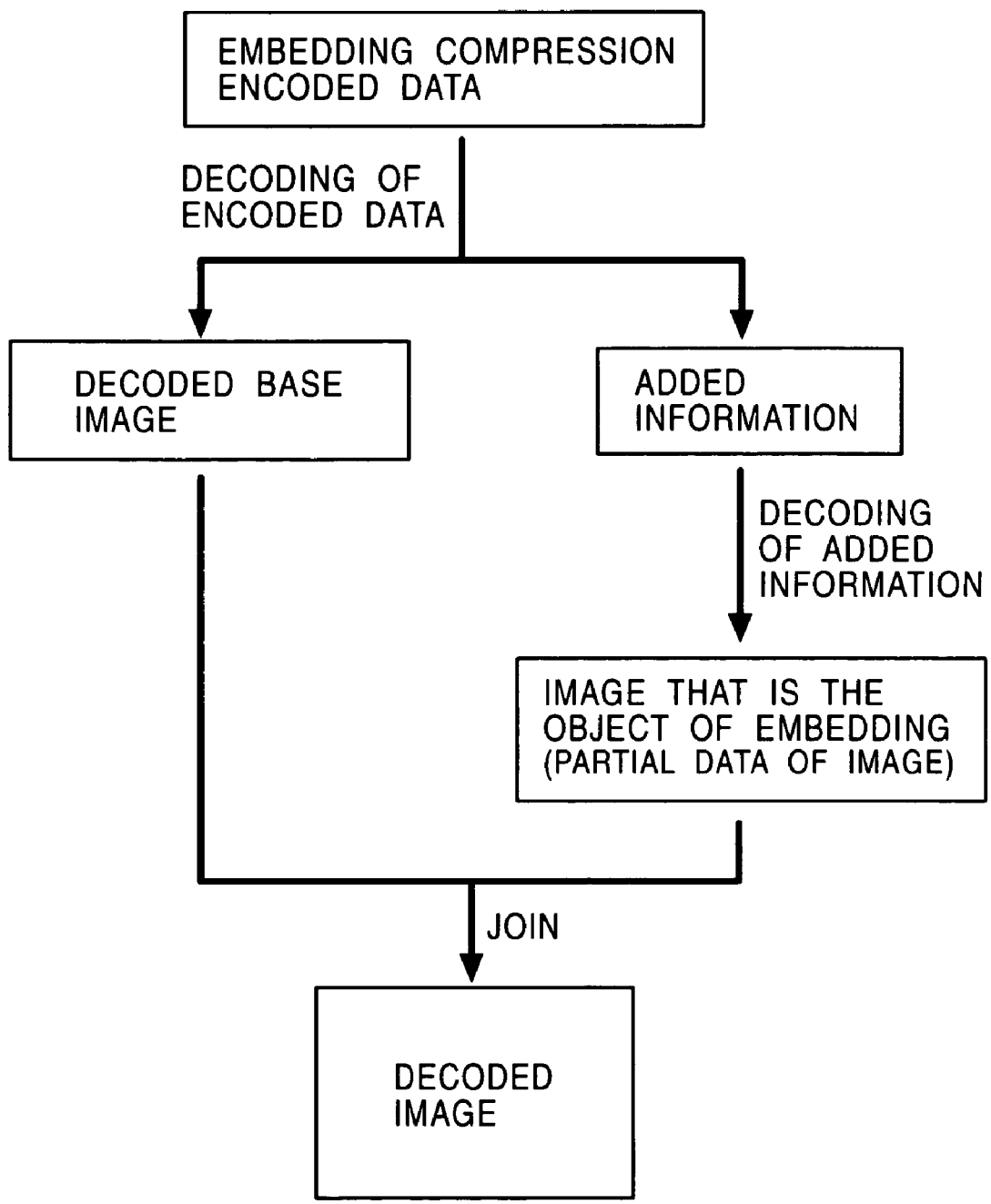
FIG. 21 is a diagram for describing the processing for decoding the remainder of an image embedded in part of the image.

Next, though the above arrangement involved the embedded compressing coding apparatus 11 embedding some sort of added information to the image to be coded, but as shown in FIG. 20, an arrangement may be made wherein the embedded compressing coding apparatus 11 divides the image to be coded into an image to which added information is to be embedded (which hereafter may be referred to as "base image"), and an image to be embedded into this base image, wherein the image to be embedded is compressed and made to be added information, and the added information is embedded into the base image, thereby forming coded data. In this case, the decoder 12 can, as shown in FIG. 21, decode the coded data into the original base image and the added information, and further decode (expand) the added information into the original image to be embedded, and join the two thereby performing decoding of the original image.

Figure 22:
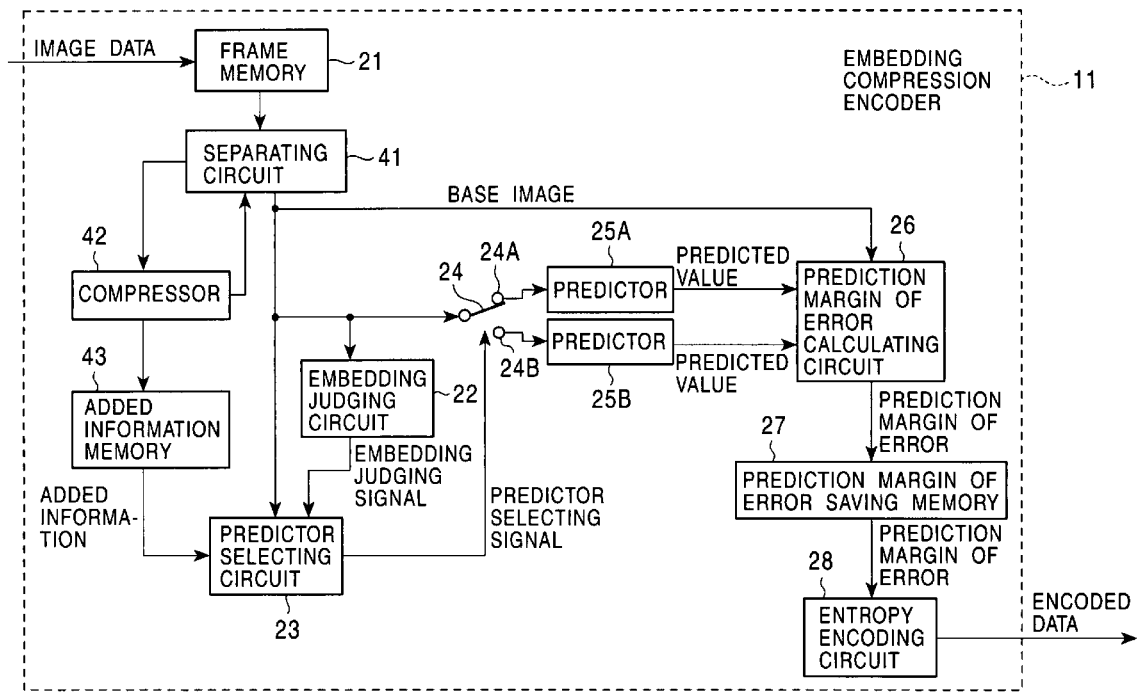
FIG. 22 is a block diagram illustrating another configuration example of the embedding compressing coding unit 11 shown in FIG. 1.

Now, FIG. 22 illustrates a configuration example of the embedded compressing coding apparatus 11 shown in FIG. 1 in the event of dividing the image to be coded into a base image and image to be embedded, and embedding the image to be embedded in the base image.

Note that the parts corresponding to that shown in FIG. 2 are denoted by the same reference numerals, and in the following description thereof will be omitted as appropriate. That is to say, the embedded compressing coding apparatus 11 shown in FIG. 22 is of the same configuration as that shown in FIG. 2, except for the addition of the dividing circuit 41, compressing unit 42, and added information memory 43.

The dividing circuit 41 optimally divides the image of one frame stored in the frame memory 21 into a base image and an image to be embedded. That is to say, the dividing circuit 41 divides an image stored in the frame memory 21 into a base image and an image to be embedded, based on the output of the compressing unit 42, such that the image to be embedded can be optimally embedded in the base image.

Here, optimal embedding means that embedding of the image to be embedded into the base image is performed as follows. Now, the amount of data which can be embedded in the base image differs according to the number of pixels making up the base image. Also, the data amount of the added information to be embedded to the base image differs according to how much the image to be embedded has been compressed at the compressing unit 42. Accordingly, optimal embedding means that added information which is the image to be embedded that has been compressed at the compressing unit 42 is embedded into the base image with no excess and no lack. Now, it would be most desirable to divide the image into the base image and image to be embedded in increments of individual pixels, but this would made the processing complicated, so here the dividing circuit 41 will divide the image into the base image and image to be embedded in increments of individual horizontal lines.

Each of the pixels making up the base image obtained at the dividing circuit 41 are supplied to the embedding judging circuit 22, predictor selecting circuit 23, switch 24, and prediction margin of error calculating circuit 26, and the image to be embedded is supplied to the compressing unit 42.

The compressing unit 42 finds, for example, the difference between adjacent pixels of the image to be embedded from the dividing circuit 41, and performs compressing by Huffman coding of the difference values or the like, thus forming added information. The added information is supplied to the added information memory 43. Further, the amount of data of the added information is supplied to the dividing circuit 41.

The added information memory 43 temporarily stores the added information to be output by the compressing unit 42, and the added information is supplied to the predictor selecting circuit 23, in increments of individual bits, for example.

Next, the processing of the embedded compressing coding apparatus 11 shown in FIG. 22 will be described with reference to the flowchart shown in FIG. 23.

The image data to be coded is sequentially supplied to the frame memory 21 in increments of individual frames, for example, and stored.

Once a particular frame of image data is stored in the frame memory 21, in step S81 the dividing circuit 41 divides the one frame of image stored in the frame memory 21 into, for example, the last line and the remainder, with the last line forming the image to be embedded and the remainder as the base image, and the image to be embedded is output to the compressing unit 42. In step S82, the compressing unit 42 compresses the image to be embedded from the dividing circuit 41, thereby forming added information. Further, the compressing unit 42 outputs the amount of data of the added information to the dividing circuit 41.

The dividing circuit 41, upon receiving the amount of data of the added information from the compressing unit 42, calculates the amount of data which can be embedded to the base image (hereafter may be referred to as "embedding space"), with the rules such as shown in FIG. 9, the flow proceeds to step S83, and judgment is made regarding whether the relation of the embedding space and the amount of data of the added information is optimal. That is, the dividing circuit 41 has the functions of the embedding judging circuit 22. Consequently, the dividing circuit 41 and the embedding judging circuit 22 may be integrally configured.

In step S83, in the event that judgement is made in the dividing circuit 41 that the relation of the embedding space and the amount of data of the added information is not optimal, that is, in this case, in the event that the embedding space is greater than the amount of data of the added information, the flow proceeds to step S84, and the dividing point at which the image stored in the frame memory 21 is divided is changed such that, for example, the number of horizontal lines of the image to be embedded is increased by one line by the dividing circuit 41. Then, the flow returns to step S81, and the dividing circuit 41 divides the image stored in the frame memory 21 at the dividing point changed to in step S84, and the same processing is repeated.

On the other hand, in the event that judgement is made in step S83 that the relation of the embedding space and the amount of data of the added information is not optimal, that is, in this case, in the event that the embedding space is maximal but does not exceed the amount of data of the added information, the dividing circuit 41 outputs the base image at this point to the embedding judging circuit 22, predictor selecting circuit 23, switch 24, and prediction margin of error calculating circuit 26. Further, the compressing unit 42 supplies the added information to the added information memory 43 where it is stored.

Then, the flow sequentially proceeds through the steps S85 through 89, where processing the same as that in step S1 through S5 in FIG. 6 is performed, and the processing ends.

Figure 23:
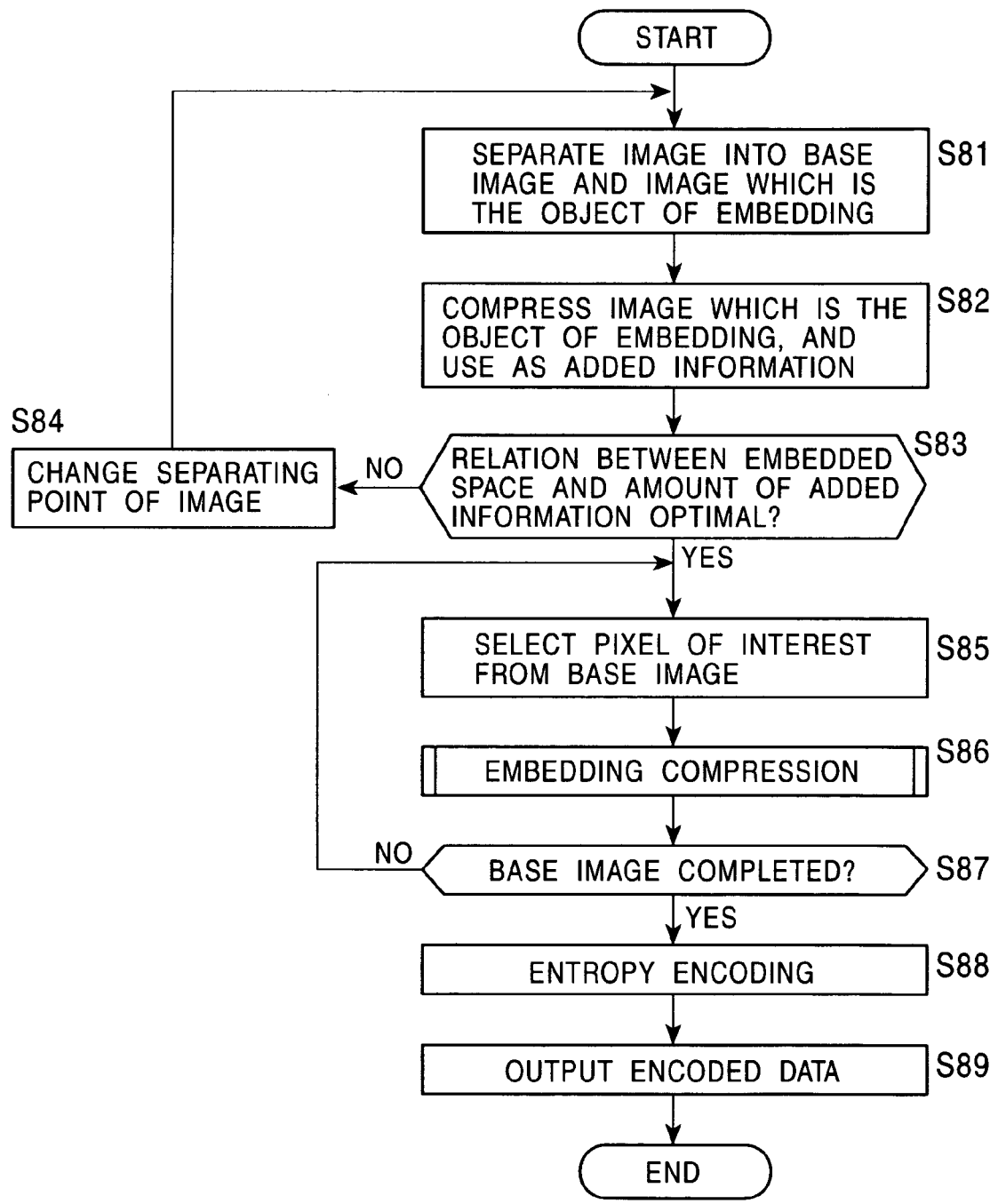
FIG. 23 is a flowchart for describing the processing of the embedding compressing coding unit 11 shown in FIG. 22.

Note that in step S87 in FIG. 23 which corresponds to step S3 in FIG. 6, judgment is made not regarding whether all pixels making up the image stored in the frame memory 21 have been made to be the pixel of interest, but rather regarding whether all pixels making up the base image obtained from the dividing circuit 41 have been made to be the pixel of interest. Also, in step S85 in FIG. 23 corresponding to step S1 in FIG. 6, the pixel of interest is selected from the base image.

Now, the processing in FIG. 23 is performed by one frame of image data being stored in the frame memory 21 for example, in the same manner as the processing shown in FIG. 6.

Figure 24:
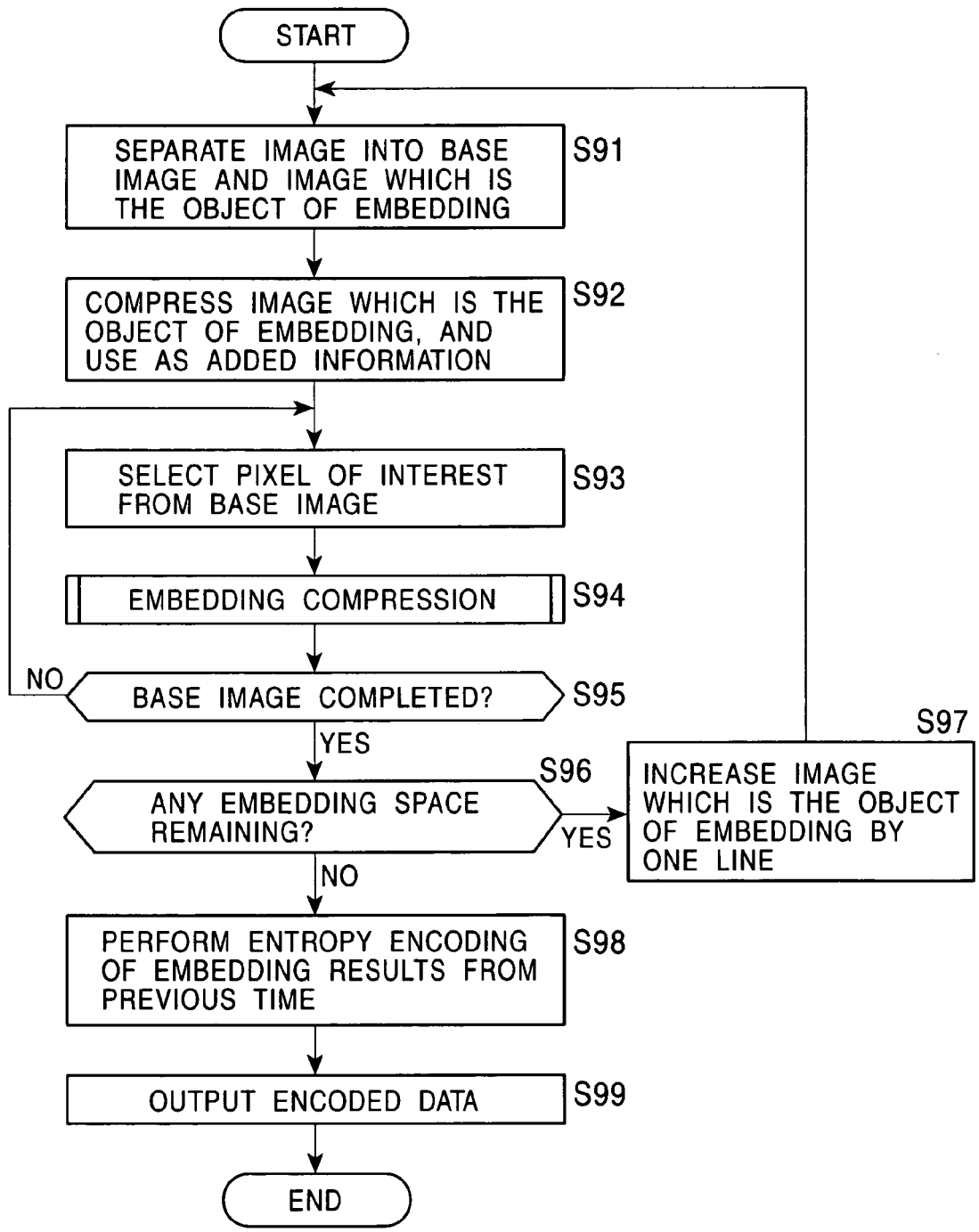
FIG. 24 is another flowchart for describing the processing of the embedding compressing coding unit 11 shown in FIG. 22.

Next, with regard to the embedded compressing coding apparatus 11 shown in FIG. 22, processing according to the flowchart shown in FIG. 24 rather than FIG. 23 may also be carried out.

That is, in this case, in step S91 the dividing circuit 41 divides the one frame of image stored in the frame memory 21 into, for example, the last line and the remainder, with the last line forming the image to be embedded and the remainder as the base image, and the image to be embedded is output to the compressing unit 42. In step S92 the compressing unit 42 compresses the image to be embedded from the dividing circuit 41, thereby forming added information, which is supplied to the added information memory 43 and stored.

Then the flow proceeds through the steps S93 through S95, wherein the same processing as that in the steps S85 through S87 in FIG. 23 is performed, whereby all added information stored in the added information memory 43 is embedded, and a prediction margin of error image made up of prediction margin of error of prediction values of the base image is stored in prediction margin of error image saving memory 27.

Subsequently, the flow proceeds to step S96, where judgment is made regarding whether or not there are any of the pixels making up the base image formed as a prediction margin of error image which can allows added information embedding, i.e., whether or not there is any embedding space remaining. In the event that judgement is made in step S96 that there is embedding space remaining, the flow proceeds to step S97, and the dividing point at which the image stored in the frame memory 21 is divided is changed such that, for example, the number of horizontal lines of the image to be embedded is increased by one line by the dividing circuit 41, in the same manner as with step S84 in FIG. 23. The flow then returns to step S91, and the dividing circuit 41 divides the image stored in the frame memory 21 at the dividing point changed to in step S97, and the same processing is repeated.

On the other hand, in the event that judgement is made in step S96 that there is no embedding space left over, i.e., that embedding space is lacking, the flow proceeds to step S98, and the entropy coding circuit 28 reads out the prediction martin of error image obtained above, stored in the prediction margin of error image saving memory 27, and subjects this to entropy encoding. Further, in step S99, the entropy coding circuit 28 outputs the coded data consequently obtained, thereby ending the processing.

Incidentally, the processing in FIG. 24 is also performed each time one frame of image data is stored in the frame memory 21, for example.

Figure 25:
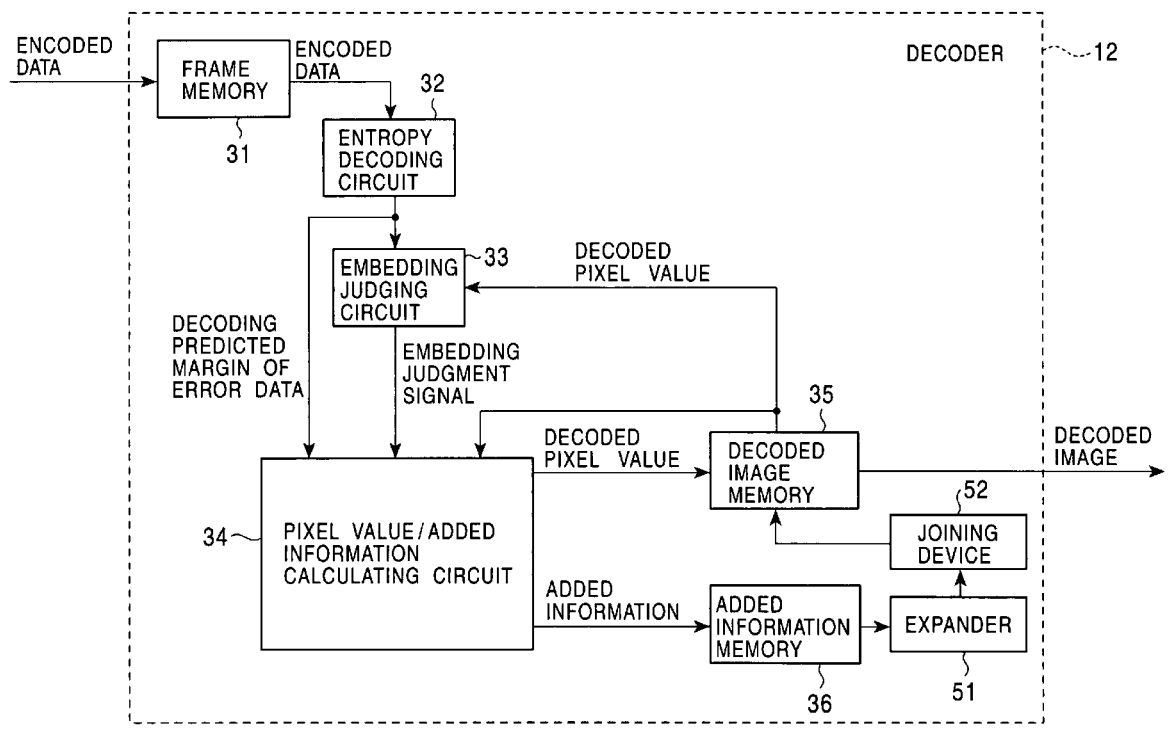
FIG. 25 is a block diagram for illustrating another configuration example of the decoding apparatus 12 shown in FIG. 1.

Next, FIG. 25 illustrates a configuration example of the decoding unit 12 shown in FIG. 1 which decodes the coded data output by the embedded compressing coding apparatus 11 shown in FIG. 22 into the original image data.

Note that the parts corresponding to that shown in FIG. 11 are denoted by the same reference numerals, and in the following description thereof will be omitted as appropriate. That is to say, the decoding apparatus 12 shown in FIG. 25 is of the same configuration as that shown in FIG. 11, except for the addition of the expander 51 and the joining unit 52.

The expander 51 decodes (expands) the added information stored in the added information memory 36, and supplies this to the joining unit 52 as the original image to be embedded. The joining unit 52 writes the image to be embedded from the expander 51 to the decoding image memory 35, and thereby joins the decoded base image and image to be embedded written to the decoding image memory 35, thus re-configuring the original one frame of image.

Figure 26:
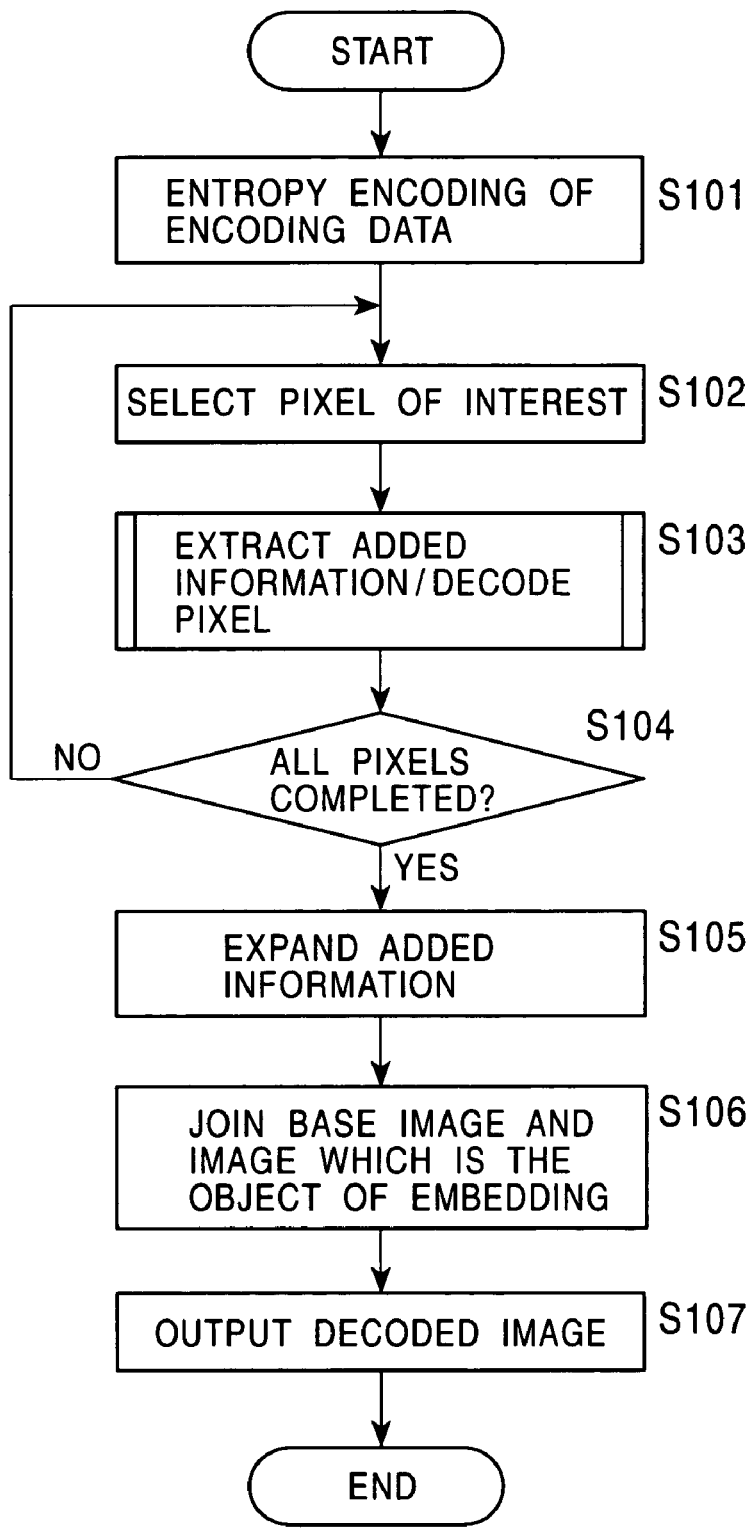
FIG. 26 is a flowchart for describing the processing of the decoding apparatus 12 shown in FIG. 25.

Next, the processing of the decoding apparatus 12 shown in FIG. 25 will be described, with reference to the flowchart in FIG. 26.

In steps S101 through 104, processing the same as that in steps S41 through 44 in FIG. 15 is performed. Then, in step S104, in the event that judgment is made that all pixels making up the prediction margin of error image wherein the coded data is subjected to entropy decoding have been made to be pixels of interest, that is to say, in the event that the decoded base image is stored in the decoding image memory 35 and the added information embedded in the base image is stored in the added information memory 36, the flow proceeds to step S105, and the expander 51 decodes the added information stored in the added information memory 36 into the image to be embedded, and supplies this to the joining unit 52. In step S106, the joining unit 52 writes the image to be embedded from the expander 51 to the decoding image memory 35, thereby joining the decoded base image and the image to be embedded, thus re-configuring the original one frame of image within the decoding image memory 35. Then, the flow proceeds to step S107, the re-configured image, stored in the decoding image memory 35, is read out and output, thus completing processing.

Figures 27, 28:
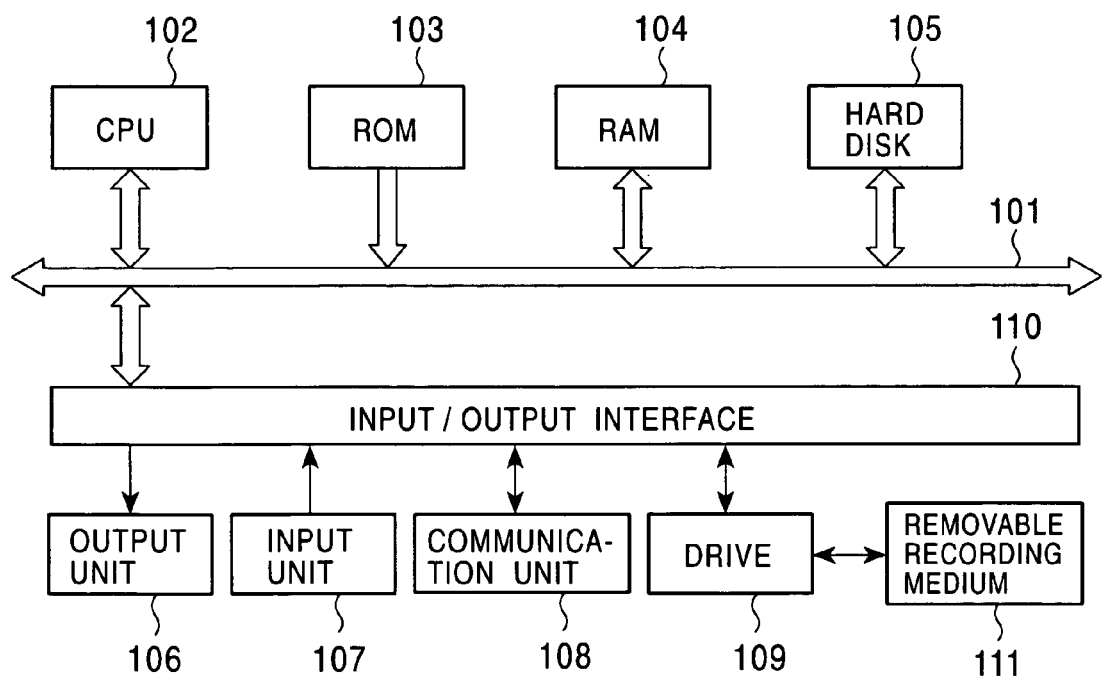
FIG. 27 is a diagram illustrating results of a simulation made by the present inventor.
FIG. 28 is a block diagram illustrating a configuration example of an embodiment of a computer to which the present invention has been applied.

Now, FIG. 27 shows simulations performed by the present inventor of compression percentages in the event that images are processed with the embedded compressing coding apparatus 11 shown in FIG. 22, and compression percentages according to conventional prediction coding. Compression percentage according to conventional prediction coding is compression percentage obtained by obtaining a prediction margin of error with the pixel adjacent in the left direction of the pixel of interest as the prediction value, the prediction margin of error being subjected to Huffman coding.

As can be understood from FIG. 27, the compression percentages of both images #1 and #2 processed with the embedded compressing coding apparatus 11 shown in FIG. 22 are improved in comparison with the conventional prediction coding.

Note that though in the above case the image to be embedded is compressed and is embedded in the base image as added information, but the image may be embedded in the base image as is, as added information.

Now, the above-described series of processing can be realized by hardware, or by software. In the event of carrying out the series of processing by software, the program comprising the software is installed in a general-use computer or the like.

Accordingly, FIG. 28 illustrates a configuration example of an embodiment of a computer wherein a program for executing the above-described series of processing (FIGS. 6, 7, 8, 15, 16, 17, 23, 24, and 26) is installed.

The program may be recorded beforehand on a hard disk 105 or ROM 103 built into the computer as a recording medium.

Or, the program may be stored (recorded) temporarily or permanently on a removable recording medium 111 such as a floppy disk, a CD-ROM (Compact Disc Read-Only Memory), an MO (Magneto-Optical) disc, a DVD (Digital Versatile Disc), a magnetic disk, or semiconductor memory. Such a removable recording medium 111 can be provided as so-called packaged software.

In addition to an arrangement in which the program is installed in a computer from such a removable recording medium 111, the program may be wirelessly transferred from a download site to the computer via satellite for digital satellite broadcast, or the program may be transferred by wire to the computer via a network such as a LAN (Local Area Network) or the Internet. The program transferred in such a manner is received at the computer by the receiving unit 108, and installed in the built-in hard disk 105.

The computer has built in a CPU (Central Processing Unit) 102. An input/output interface 110 is connected to the CPU 102 via a bus 101. Upon receiving commands due to the user operating an input unit 107 made up of a keyboard or a mouse or the like, via the input/output interface 110, the CPU 102 executes a program stored in ROM (Read-Only Memory) 103, accordingly. Or, the CPU 102 loads, into RAM (Random Access Memory) 104, a program that is stored in the hard disk 105 or a program transferred via the satellite or the network and received by the receiving unit 108 and installed in the hard disk 105, or a program read out from removable recording medium 111 that is mounted in a drive 109 and installed in the hard disk 105, and executes the program. Thus, the CPU 102 performs the processing according to the above-described flowcharts, or the processing performed according to the configuration illustrated in the above-described block diagrams. Then, as necessary, the CPU 102 outputs the processing results from an and output unit 106 made up of an LCD (Liquid Crystal Display) or speaker or the like via an input/output interface for example, or transmits the results from a communication unit 108, or further records the results in the hard disk 105, etc.

Now, in the present specification, the processing steps described by the programs for causing the computer to execute various processes need not always be executed in a time-series manner in order as described in the flowcharts, and the invention encompasses processing in which the steps are executed in parallel or individually (e.g., parallel processing or object processing).

Also, the program may be processed by a single computer, or may be subjected to shared tasking between multiple computers. Further, the program may be transferred to a remote computer to be executed.

Also, though the present embodiment involves using pixels adjacent to the pixel of interest in the upper, left, or upper left directions as prediction values for the pixel of interest, other pixels (e.g., pixels near the pixel of interest, either space-wise or time-wise) may be used as the prediction values thereof, as well.

Further, the prediction values of the pixel of interest is not restricted to the actual pixel values adjacent in the left, upper, or upper left directions, and also may be values obtained by performing linear prediction therefrom, for example.

Also, though the present embodiment involves preparing two prediction methods and selecting which prediction method to use according to the added information, three or more, i.e., N prediction methods may be prepared, and in the case, the added information can be embedded to each pixel in increments of $\log_2 N$ bits.

Moreover, though the present embodiment involves embedding added information to an image, added information may also be embedded to, e.g., audio data, programs, and so forth.

What is claimed is:

1. An embedded coding apparatus for embedding second data in first data, and outputting coded data, said apparatus comprising:
    selecting means for selecting a predicting method for predicting data of interest in said first data, based on said second data;
    predicting means for obtaining a prediction value corresponding to said data of interest based on the prediction method selected by said selecting means; and
    prediction margin of error computing means for computing prediction margin of error based on said data of interest and said prediction value, and outputting as said coded data; wherein said coded data has no additional information representing the prediction method.

2. An embedded coding apparatus according to claim 1, wherein said predicting means takes data nearby said data of interest within said first data as a prediction value corresponding to said data of interest.

3. An embedded coding apparatus according to claim 1, further comprising judging means for judging whether or not said second data can be embedded as to said data of interest;
    wherein, in the event that said judging means has judged that said second data can be embedded as to said data of interest, said selecting means makes selection of said prediction method based on said second data.

4. An embedded coding apparatus according to claim 3, wherein, in the event that said judging means has judged that said second data cannot be embedded as to said data of interest, said selecting means makes selection of said prediction method based on said data of interest and said first data used for prediction of said data of interest;
    and wherein said predicting means obtains a prediction value corresponding to said data of interest, based on the prediction method selected by said selecting means.

5. An embedded coding apparatus according to claim 3, wherein said judging means judges whether or not said second data can be embedded as to said data of interest, based on said data of interest and said first data used for prediction of said data of interest.

6. An embedded coding apparatus according to claim 5, wherein said judging means judges the magnitude relation between said data of interest and two sets of said first data used for prediction of said data of interest;
    and wherein, in the event that said data of interest is a value within the range of said two sets of first data, judgment is made that said second data can be embedded as to said data of interest;
    and wherein, in the event that said data of interest is a value not within the range of said two sets of first data, judgment is made that said second data cannot be embedded as to said data of interest.

7. An embedded coding apparatus according to claim 6, wherein, in the event that said judging means judges that said second data can be embedded as to said data of interest, said selecting means selects one of two predicting methods used for predicting said data of interest respectively having said two sets of first data as said prediction values thereof, based on said second data.

8. An embedded coding apparatus according to claim 6, wherein, in the event that said judging means judges that said second data cannot be embedded as to said data of interest, said selecting means selects, of the two predicting methods used for predicting said data of interest respectively having said two sets of first data, that with the greater prediction margin of error, as said prediction values thereof.

9. An embedded coding apparatus according to claim 6, wherein, in the event that said two sets of said first data used for prediction of said data of interest are the same value, two sets of first data are extracted, made up of one of said two sets of first data and another set of first data nearby said data of interest;
    and wherein said judging means judges the magnitude relation between said data of interest and two sets of said first data used for prediction of said data of interest;
    and wherein, in the event that said data of interest is a value within the range of said two sets of first data, judgment is made that said second data can be embedded as to said data of interest;
    and wherein, in the event that said data of interest is a value not within the range of said two sets of first data, judgment is made that said second data cannot be embedded as to said data of interest.

10. An embedded coding apparatus according to claim 9, wherein, in the event that said judging means judges that said second data can be embedded as to said data of interest, said selecting means selects one of two predicting methods used for predicting said data of interest respectively having said two sets of first data as said prediction values thereof based on said second data.

11. An embedded coding apparatus according to claim 9, wherein, in the event that said judging means judges that said second data cannot be embedded as to said data of interest, said selecting means selects, of two predicting methods used for predicting said data of interest respectively having said two sets of first data, that with the greater prediction margin of error, as said prediction values thereof.

12. An embedded coding apparatus according to claim 1, wherein said first data is image data.

13. An embedded coding apparatus according to claim 12, wherein said first data and said second data is one part and the other part of said image data separated into two.

14. An embedded coding apparatus according to claim 13, further comprising separating means for separating said image data into two parts, for embedding said second data as said other part as to said first data as said one part.

15. An embedded coding apparatus according to claim 14, further comprising compressing means for compressing said second data separated by said separating means, wherein said separating means counts the amount of data capable of being embedded in said first data, compares said counted data amount and said compressed second data amount, and optimally separates said image data into two, based on said comparison results.

16. A method for embedding second data in first data, and outputting coded data, comprising the steps of:
   selecting a predicting method for predicting data of interest in said first data, based on said second data;
   obtaining a prediction value corresponding to said data of interest based on the selected prediction method;
   computing prediction margin of error based on said data of interest and said prediction value; and
   outputting said prediction margin of error as said coded data; wherein said coded data has no additional information representing the prediction method.

17. A storage medium for storing a program, which is controllable by a computer, for embedding second data in first data, and outputting coded data, said program comprising the steps of:
   selecting a predicting method for predicting data of interest in said first data, based on said second data;
   obtaining a prediction value corresponding to said data of interest based on the selected prediction method;
   computing prediction margin of error based on said data of interest and said prediction value; and
   outputting said prediction margin of error as said coded data; wherein said coded data has no additional information representing the prediction method.

18. A decoding apparatus for decoding coded data encoded by embedding second data in first data, into said first data and said second data, said apparatus comprising:
   recognizing means for recognizing a prediction method for predicting a prediction value corresponding to said first data, from data of interest in said coded data; wherein said coded data has no additional information representing the prediction method; and
   decoding means for decoding said data of interest into the original said first data, and also decoding said second data, based on said prediction method recognized by said recognizing means.

19. A decoding apparatus according to claim 18, further comprising judging means for judging whether or not said second data is embedded as to said data of interest;
   wherein, in the event that said judging means has judged that said second data is embedded as to said data of interest, said second data is decoded based on said prediction method.

20. A decoding apparatus according to claim 19, wherein said judging means judges whether or not said second data is embedded as to said data of interest, based on said data of interest and said first data already decoded.

21. A decoding apparatus according to claim 20, wherein, in the event that said judging means judges that said second data is not embedded as to said data of interest, said recognizing means recognizes said prediction method based on said data of interest and said first data already decoded, and said decoding means decodes said data of interest into the original said first data, based on the prediction method recognized by said recognizing means.

22. A decoding apparatus according to claim 20, wherein said judging means judges the magnitude relation between said data of interest and two sets of said first data already decoded;
   and wherein, in the event that said data of interest is smaller than the difference between said two sets of first data already decoded, judgment is made that said second data is embedded as to said data of interest;
   and wherein, in the event that said data of interest is not smaller than the difference between said two sets of first data already decoded, judgment is made that said second data is not embedded as to said data of interest.

23. A decoding apparatus according to claim 22, wherein, of the predicting methods respectively having said two sets of already-decoded first data as said prediction values thereof with regard to said data of interest in which said second data is embedded, said recognizing means recognizes the prediction method wherein the decoding results of said data of interest are within the range of said two sets of first data as being the prediction method for predicting said first data corresponding to said data of interest.

24. A decoding apparatus according to claim 22, wherein, of the predicting methods respectively having said two sets of already-decoded first data as said prediction values thereof with regard to said data of interest in which said second data is not embedded, said recognizing means recognizes the prediction method with the greater prediction margin of error as being the prediction method for predicting said first data corresponding to said data of interest.

25. A decoding apparatus according to claim 22, wherein, in the event that said two sets of said first data already decoded are the same value, two sets of first data comprising one of said two sets of first data and the other first data already decoded are extracted;
   and wherein said judging means judges the magnitude relation between said data of interest and two sets of said first data;
   and wherein, in the event that said data of interest is smaller than the difference between said two sets of first data, judgment is made that said second data is embedded as to said data of interest;
   and wherein, in the event that said data of interest is not smaller than the difference between said two sets of first data, judgment is made that said second data is not embedded as to said data of interest.

26. A decoding apparatus according to claim 25, wherein, of the predicting methods respectively having said two sets of first data as said prediction values thereof with regard to said data of interest in which said second data is embedded, said recognizing means recognizes the prediction method wherein the decoding results of said data of interest are within the range of said two sets of first data as being the prediction method for predicting said first data corresponding to said data of interest.

27. A decoding apparatus according to claim 25, wherein, of the predicting methods respectively having said two sets of first data as said prediction values thereof with regard to said data of interest in which said second data is not embedded, said recognizing means recognizes the prediction method wherein the prediction margin of error is greater as being the prediction method for predicting said first data corresponding to said data of interest.

28. A decoding apparatus according to claim 18, wherein said first data is image data.

29. A decoding apparatus according to claim 28, wherein said first data and said second data is one part and the other part of said image data separated into two.

30. A decoding apparatus according to claim 29, further comprising joining means for joining said decoded first data as said one part and said decoded second data as said other part, to configure the original said image.

31. A decoding apparatus according to claim 30, wherein, in the event that said second data is compressed and embedded in said first data, said decoding means decodes said compressed second data;
and further wherein decoding apparatus comprises expanding means for expanding said compressed second data back into second data, said joining means joining said decoded first data and said second expanded data to configure the original said image.

32. A decoding method for decoding coded data encoded by embedding second data in first data, into said first data and said second data, comprising the steps of:
recognizing a prediction method for predicting a prediction value corresponding to said first data, from data of interest in said coded data; wherein said coded data has no additional information representing the prediction method; and
decoding said data of interest into the original said first data, and also decoding said second data, based on said recognized prediction method.

33. A storage medium for storing a program, which is controllable by a computer, for decoding coded data encoded by embedding second data in first data, said program comprising the steps of:
recognizing a prediction method for predicting a prediction value corresponding to said first data, from data of interest in said coded data; wherein said coded data has no additional information representing the prediction method; and
decoding said data of interest into the original said first data, and also decoding said second data, based on said recognized prediction method.

34. An embedded coding apparatus for embedding second data in first data, and outputting coded data, said apparatus comprising:
a selector configured to select a predicting method for predicting data of interest in said first data, based on said second data;
a predictor configured to obtain a prediction value corresponding to said data of interest based on the prediction method selected by said selector; and
a prediction margin of error computer configured to compute prediction margin of error based on said data of interest and said prediction value, and outputting as said coded data; wherein said coded data has no additional information representing the prediction method.

35. A decoding apparatus for decoding coded data encoded by embedding second data in first data, into said first data and said second data, said apparatus comprising:
a recognizer configured to recognize a prediction method for predicting a prediction value corresponding to said first data, from data of interest in said coded data; wherein said coded data has no additional information representing the prediction method; and
a decoder configured to decode said data of interest into the original said first data, and also decoding said second data, based on said prediction method recognized by said recognizer.

* * * * *